(12) United States Patent
Ikeda et al.

(10) Patent No.: US 11,657,775 B2
(45) Date of Patent: May 23, 2023

(54) DISPLAY DEVICE

(71) Applicant: Japan Display Inc., Tokyo (JP)

(72) Inventors: Kojiro Ikeda, Tokyo (JP); Kentaro Okuyama, Tokyo (JP); Masaaki Kabe, Tokyo (JP)

(73) Assignee: Japan Display Inc., Tokyo (JP)

( * ) Notice: Subject to any disclaimer, the term of this patent is extended or adjusted under 35 U.S.C. 154(b) by 62 days.

(21) Appl. No.: 17/191,332

(22) Filed: Mar. 3, 2021

(65) Prior Publication Data

US 2021/0193062 A1  Jun. 24, 2021

Related U.S. Application Data

(63) Continuation of application No. PCT/JP2019/031867, filed on Aug. 13, 2019.

(30) Foreign Application Priority Data

Sep. 3, 2018 (JP) ............................ JP2018-164864

(51) Int. Cl.
*G09G 3/20* (2006.01)
*G09G 3/36* (2006.01)
*G02F 1/1334* (2006.01)

(52) U.S. Cl.
CPC ......... *G09G 3/3607* (2013.01); *G02F 1/1334* (2013.01)

(58) Field of Classification Search
CPC .... G09G 3/3607; G09G 3/342; G09G 3/3648; G09G 2310/0235; G09G 2310/024; G09G 2320/0242; G02F 1/133622; G02F 1/133514; G02F 1/133603; G02F 1/1334; G02F 1/133621

USPC .......................................................... 345/55
See application file for complete search history.

(56) References Cited

U.S. PATENT DOCUMENTS

| 2009/0315921 | A1 | 12/2009 | Sakaigawa et al. |
| 2016/0116768 | A1 | 4/2016 | Okuyama et al. |
| 2017/0221407 | A1* | 8/2017 | Kobayashi ............... G09G 3/36 |
| 2018/0081248 | A1* | 3/2018 | Kitamura .......... G02F 1/133606 |

(Continued)

FOREIGN PATENT DOCUMENTS

| JP | 2002318564 A | 10/2002 |
| JP | 2008089929 A | 4/2008 |
| JP | 2010033009 A | 2/2010 |

(Continued)

OTHER PUBLICATIONS

International Search Report dated Oct. 8, 2019 in connection with PCT/JP2019/031867.

(Continued)

*Primary Examiner* — Jennifer T Nguyen
(74) *Attorney, Agent, or Firm* — K&L Gates LLP

(57) ABSTRACT

A display device includes a first light-transmitting substrate, a second light-transmitting substrate opposed to the first light-transmitting substrate, a liquid crystal layer comprising polymer dispersed liquid crystals filled between the first light-transmitting substrate and the second light-transmitting substrate, at least one light emitter opposed to at least one of a side surface of the first light-transmitting substrate and a side surface of the second light-transmitting substrate, and a first electrode and a second electrode disposed so as to sandwich the liquid crystal layer.

18 Claims, 32 Drawing Sheets

(56) References Cited

U.S. PATENT DOCUMENTS

2018/0211611 A1* 7/2018 Kato ................ G02F 1/134309
2018/0286327 A1* 10/2018 Yashiki ............... H01L 27/1214

FOREIGN PATENT DOCUMENTS

| JP | 2016085452 A | 5/2016 |
| JP | 2018120021 A | 8/2018 |
| WO | 2017051768 A1 | 3/2017 |

OTHER PUBLICATIONS

Japanese Office Action dated Aug. 26, 2022 in corresponding Japanese Application No. 2018-164864.

* cited by examiner

DISPLAY DEVICE

CROSS-REFERENCE TO RELATED APPLICATION

This application is a continuation of PCT international application Ser. No. PCT/2019/031867 filed on Aug. 13, 2019 which designates the United States, incorporated herein by reference, and which claims the benefit of priority from Japanese Patent Application No. 2018-164864 filed on Sep. 3, 2018, incorporated herein by reference.

BACKGROUND

1. Technical Field

The present disclosure relates to a display device.

2. Description of the Related Art

Japanese Patent Application Laid-open Publication No. 2016-85452 (JP-A-2016-85452) describes a display device that includes a light modulation layer and a light source. The light modulation layer is disposed between a pair of transparent substrates, and includes a plurality of light modulation devices that have predetermined refractive index anisotropy and differ in responsiveness to an electric field generated by electrodes provided on the transparent substrates. The light source emits light in a predetermined color into the light modulation layer from a side surface of the light modulation layer. The light modulation layer transmits the light incident from the light source when the electric field is not generated, and scatters the incident light and emits the scattered light to the transparent substrates when the electric field is generated.

In the display device described in JP-A-2016-85452, the scattering rate of the light needs to be increased to improve visibility of display. Consequently, the voltage applied to pixel electrodes needs to be increased to increase the scattering rate of the light. However, the voltage applied to the pixel electrodes has an upper limit due to a limitation in output range of a drive circuit.

It is an object of the present invention to provide a display device allowing a background to be visible when viewed from one surface of a display panel toward the other surface thereof, and being capable of improving the visibility of an image displayed on the display panel.

SUMMARY

A display device according to an aspect includes a first light-transmitting substrate, a second light-transmitting substrate opposed to the first light-transmitting substrate, a liquid crystal layer comprising polymer dispersed liquid crystals filled between the first light-transmitting substrate and the second light-transmitting substrate, at least one light emitter opposed to at least one of a side surface of the first light-transmitting substrate and a side surface of the second light-transmitting substrate, and a first electrode and a second electrode disposed so as to sandwich the liquid crystal layer. In the light emitter, any one of a first color, a second color, a third color, and a fourth color emits light in a field-sequential system, and the display device comprises a drive circuit configured to convert a received first input signal into a second input signal including gradation values of the first color, the second color, the third color, and the fourth color based on red-green-blue (RGB) signals of the first color, the second color, and the third color that are included in the first input signal and are each to be displayed by a corresponding one of pixels.

DETAILED DESCRIPTION

Figure 1:
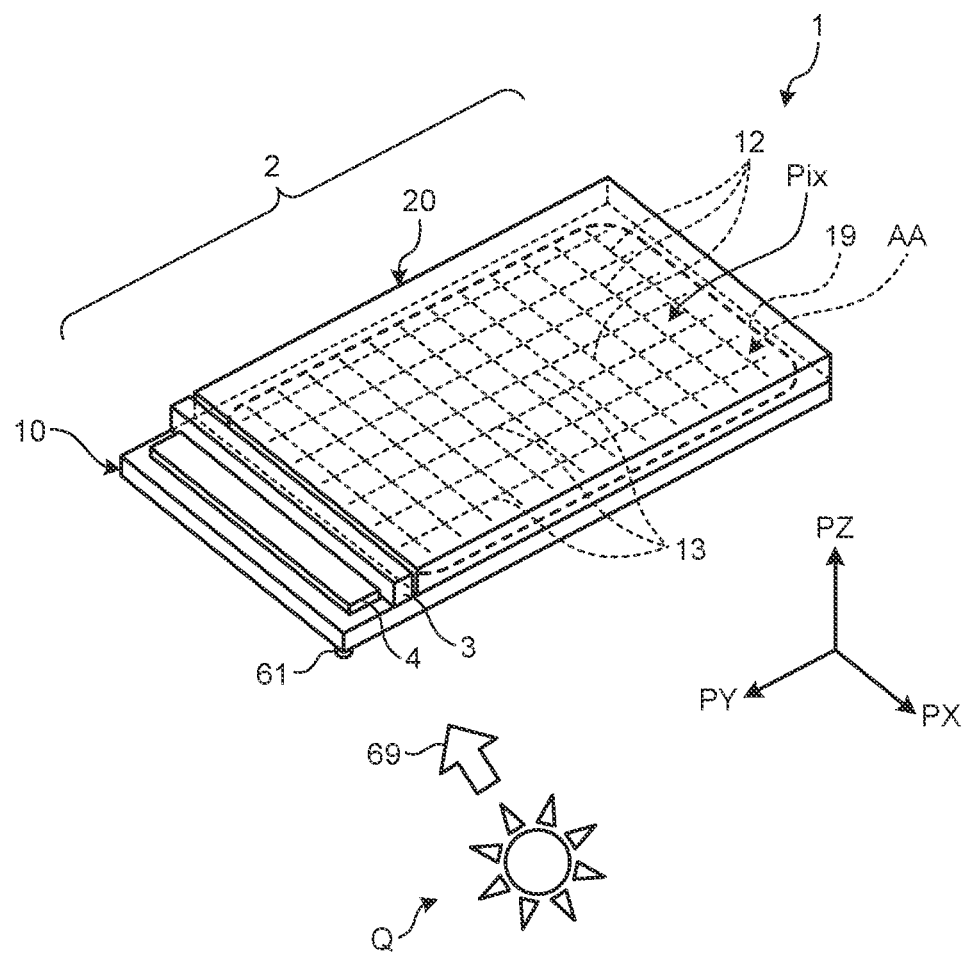
FIG. 1 is a perspective view illustrating an example of a display device according to an embodiment of the present invention.

The following describes forms (embodiments) for carrying out the present disclosure in detail with reference to the drawings. The present disclosure is not limited to the description of the embodiments to be given below. Components to be described below include those easily conceivable by those skilled in the art or those substantially identical thereto. Moreover, the components to be described below can be appropriately combined. The disclosure is merely an example, and the present disclosure naturally encompasses appropriate modifications easily conceivable by those skilled in the art while maintaining the gist of the disclosure. To further clarify the description, widths, thicknesses, shapes, and the like of various parts are schematically illustrated in the drawings as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

First Embodiment

Figure 2:
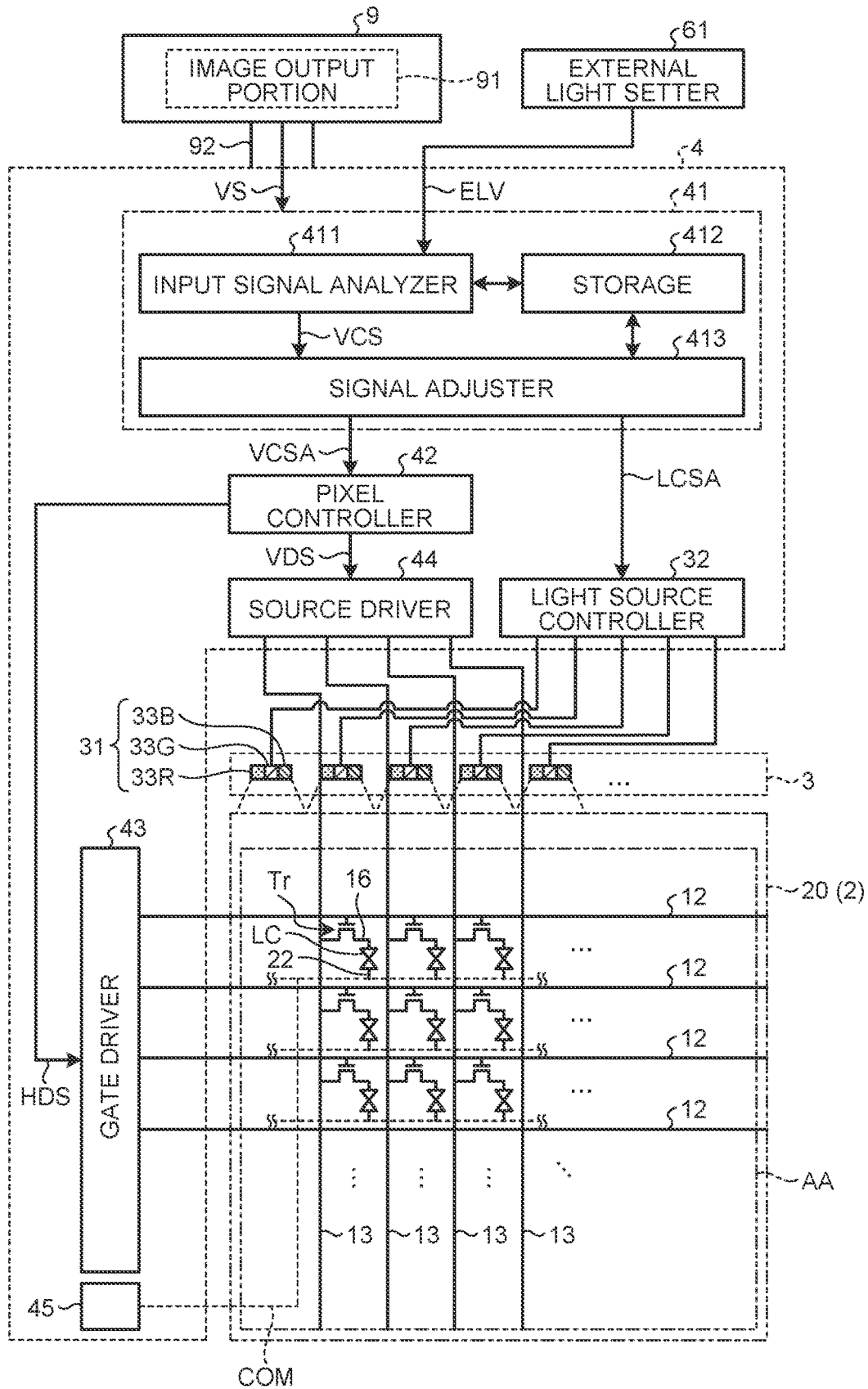
FIG. 2 is a block diagram illustrating a display device according to a first embodiment.
Figure 3:
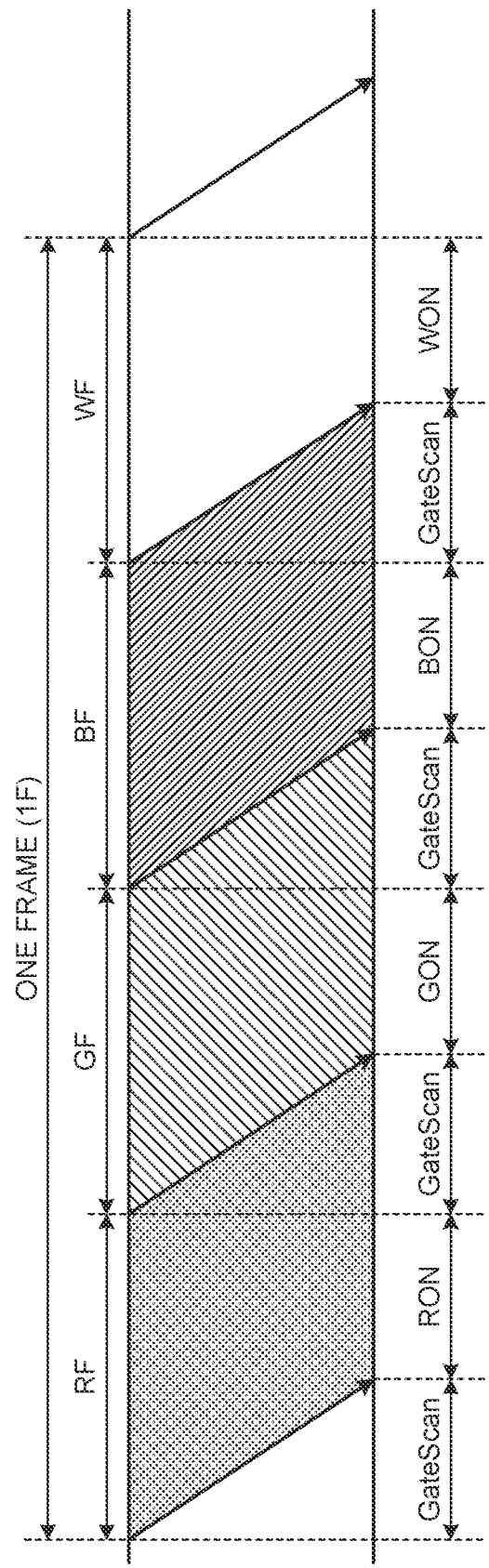
FIG. 3 is a timing diagram explaining timing of light emission by a light source in a field-sequential system according to the first embodiment.

FIG. 1 is a perspective view illustrating an example of a display device according to the present embodiment. FIG. 2 is a block diagram illustrating the display device of FIG. 1. FIG. 3 is a timing diagram explaining timing of light emission by a light source in a field-sequential system.

As illustrated in FIG. 1, a display device 1 includes a display panel 2, a side light source 3, a drive circuit 4, and an external light setter 61. A PX direction denotes one direction of the display panel 2. A PY direction denotes a direction orthogonal to the PX direction. A PZ direction denotes a direction orthogonal to a PX-PY plane.

Figure 5:
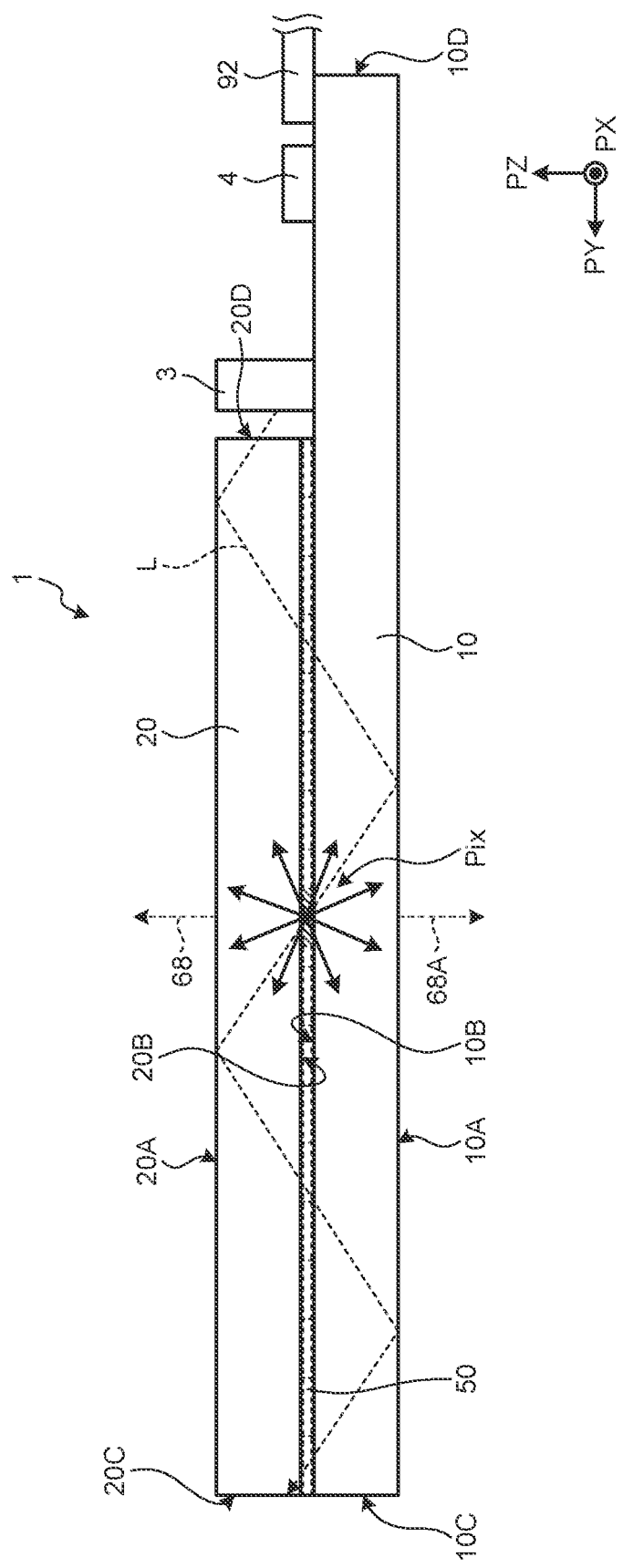
FIG. 5 is a sectional view illustrating an exemplary section of the display device of FIG. 1.

The display panel 2 includes a first light-transmitting substrate 10, a second light-transmitting substrate 20, and a liquid crystal layer 50 (refer to FIG. 5). The second light-transmitting substrate 20 is opposed to a surface of the first light-transmitting substrate 10 in a direction orthogonal thereto (in the PZ direction in FIG. 1). Polymer dispersed liquid crystals (to be described later) are sealed in the liquid crystal layer 50 (refer to FIG. 5) by the first light-transmitting substrate 10, the second light-transmitting substrate 20, and a sealing part 19.

As illustrated in FIG. 1, the inside of the sealing part 19 in the display panel 2 serves as a display region AA. A plurality of pixels Pix are arranged in a matrix having a row-column configuration in the display region AA. In the present disclosure, a row refers to a pixel row including m pixels Pix arranged in one direction, and a column refers to a pixel column including n pixels Pix arranged in a direction orthogonal to the direction in which the rows are arranged. The values of m and n are determined according to a display resolution in the vertical direction and a display resolution in the horizontal direction. A plurality of scanning lines 12 are wired row by row, and a plurality of signal lines 13 are wired column by column.

The side light source 3 includes a plurality of light emitters 31. As illustrated in FIG. 2, a light source controller 32 is included in the drive circuit 4. The light source controller 32 may be a circuit separate from the drive circuit 4. The light emitters 31 are electrically coupled to the light source controller 32 through wiring in the first light-transmitting substrate 10.

For example, the external light setter 61 is a visible light sensor, and the visible light sensor detects external light 69 of, for example, an external light source Q, and generates information on tristimulus values obtained by separating the external light 69 into spectral components based on the wavelength as a signal ELV of external light information. The external light setter 61 transmits the generated signal ELV of the external light information to the drive circuit 4. The external light setter 61 is fixed to a surface of the first light-transmitting substrate 10. The external light setter 61 may be fixed to any position as long as being capable of detecting the external light 69 around the display panel 2.

For example, the external light setter 61 is not limited to the visible light sensor, and may be an external light setting switch. The external light setting switch generates the signal ELV of the external light information based on a set value of the external light information set in advance by a viewer according to visible light of the external light 69. For example, for the external light setting switch, set values for the external light tri stimulus values serving as the external light information are specified for each of a plurality of environmental modes, such as a sunlit clear sky mode (first environment mode), a sunlit cloudy sky mode (second environment mode), an indoor use mode (third environment mode), and a night use mode (fourth environment mode). The external light setter 61 transmits the generated signal ELV of the external light information to the drive circuit 4. When the external light setter 61 is the external light setting switch, the position where the external light setting switch is fixed is not limited as long as being a position from which the signal ELV of the external light information can be transmitted to the drive circuit 4.

As illustrated in FIG. 1, the drive circuit 4 is fixed to the surface of the first light-transmitting substrate 10. As illustrated in FIG. 2, the drive circuit 4 includes an analyzer 41, a pixel controller 42, a gate driver 43, a source driver 44, and a common potential driver 45. The first light-transmitting substrate 10 has an area larger than that of the second light-transmitting substrate 20 in an X-Y plane, and the drive circuit 4 is provided on an overhanging portion of the first light-transmitting substrate 10 exposed from the second light-transmitting substrate 20.

The analyzer 41 receives an input signal (such as a red-green-blue (RGB) signal) VS from an image output portion 91 of an external higher-level controller 9 through a flexible substrate 92.

The analyzer 41 includes an input signal analyzer 411, a storage 412, and a signal adjuster 413. The input signal analyzer 411 generates a second input signal VCS based on an externally received first input signal VS.

The second input signal VCS is a signal for determining a gradation value to be given to each of the pixels Pix of the display panel 2 based on the first input signal VS. In other words, the second input signal VCS is a signal including gradation information on the gradation value of each of the pixels Pix.

The input signal analyzer 411 receives the signal ELV of the external light information from the external light setter 61 described above. The input signal analyzer 411 generates the second input signal VCS corresponding to the signal ELV of the external light information as will be described later.

The signal adjuster 413 generates a third input signal VCSA from the second input signal VCS. The signal adjuster 413 transmits the third input signal VCSA to the pixel controller 42, and transmits a light source control signal LCSA to the light source controller 32. The light source control signal LCSA is a signal including information on light quantities of the light emitters 31 set according to, for example, input gradation values given to the pixels Pix. For example, the light quantities of the light emitters 31 are set smaller when a darker image is displayed, and set larger when a brighter image is displayed.

The pixel controller 42 generates a horizontal drive signal HDS and a vertical drive signal VDS based on the third input signal VCSA. In the present embodiment, since the display device 1 is driven by the field-sequential system, the horizontal drive signal HDS and the vertical drive signal VDS are generated for each color emittable by the light emitter 31.

The gate driver 43 sequentially selects the scanning lines 12 of the display panel 2 based on the horizontal drive signal HDS during one vertical scanning period. The scanning lines 12 can be selected in any order.

The source driver 44 supplies a gradation signal according to the output gradation value of each of the pixels Pix to a corresponding one of the signal lines 13 of the display panel 2 based on the vertical drive signal VDS during one horizontal scanning period.

In the present embodiment, the display panel 2 is an active-matrix panel. Hence, the display panel 2 includes the signal (source) lines 13 extending in the PY direction and the scanning (gate) lines 12 extending in the PX direction in a plan view, and includes switching elements Tr at intersecting portions between the signal lines 13 and the scanning lines 12.

A thin-film transistor is used as each of the switching elements Tr. A bottom-gate transistor or a top-gate transistor may be used as an example of the thin-film transistor. Although a single-gate thin film transistor is exemplified as the switching element Tr, the switching element Tr may be a double-gate transistor. One of the source electrode and the drain electrode of the switching element Tr is coupled to each of the signal lines 13, and the gate electrode of the switching element Tr is coupled to each of the scanning lines 12. The other of the source electrode and the drain electrode is coupled to one end of a liquid crystal capacitor LC. The liquid crystal capacitor LC is coupled at one end thereof to the switching element Tr through a pixel electrode 16, and coupled at the other end thereof to a common potential COM through a common electrode 22. The common potential COM is supplied from the common potential driver 45.

Each of the light emitters 31 includes a light emitter 33R of a first color (such as red), a light emitter 33G of a second color (such as green), and a light emitter 33B of a third color (such as blue). The light source controller 32 controls the light emitter 33R of the first color, the light emitter 33G of the second color, and the light emitter 33B of the third color so as to emit light in a time-division manner based on the light source control signal LCSA. In this manner, the light emitter 33R of the first color, the light emitter 33G of the second color, and the light emitter 33B of the third color are driven based on the field-sequential system.

As illustrated in FIG. 3, during a first sub-frame (first predetermined time) RF, the light emitter 33R of the first color emits light during a first color light emission period RON, and some of the pixels Pix selected during one vertical scanning period GateScan scatter light to perform display. On the entire display panel 2, if the gradation signal corresponding to the output gradation value of each of the pixels Pix selected during the one vertical scanning period GateScan is supplied to a corresponding one of the above-described signal lines 13, only the first color is lit up during the first color light emission period RON.

Then, during a second sub-frame (second predetermined time) GF, the light emitter 33G of the second color emits light during a second color light emission period GON, and some of the pixels Pix selected during the one vertical scanning period GateScan scatter light to perform display. On the entire display panel 2, if the gradation signal corresponding to the output gradation value of each of the pixels Pix selected during the one vertical scanning period GateScan is supplied to a corresponding one of the above-described signal lines 13, only the second color is lit up during the second color light emission period GON.

Further, during a third sub-frame (third predetermined time) BF, the light emitter 33B of the third color emits light during a third color light emission period BON, and some of the pixels Pix selected during the one vertical scanning period GateScan scatter light to perform display. On the entire display panel 2, if the gradation signal corresponding to the output gradation value of each of the pixels Pix selected during the one vertical scanning period GateScan is supplied to a corresponding one of the above-described signal lines 13, only the third color is lit up during the third color light emission period BON.

Furthermore, during a fourth sub-frame (fourth predetermined time) WF, the light emitter 33R of the first color, the light emitter 33G of the second color, and the light emitter 33B of the third color simultaneously emit light during a fourth color light emission period WON, and some of the pixels Pix selected during the one vertical scanning period GateScan scatter light to perform display. On the entire display panel 2, if the gradation signal corresponding to the output gradation value of each of the pixels Pix selected during the one vertical scanning period GateScan is supplied to a corresponding one of the above-described signal lines 13, only the fourth color is lit up during the fourth color light emission period WON. In this manner, in the display device 1, the first color light emission period RON, the second color light emission period GON, the third color light emission period BON, and the fourth color period WON are sequentially processed during one frame period.

Since a human eye has limited temporal resolving power, and produces an afterimage, an image with a combination of four colors is recognized in a period of one frame (1F). The field-sequential system can eliminate the need for a color filter, and thus can reduce an absorption loss by the color filter. As a result, higher transmittance can be obtained. In the color filter system, one pixel is made up of sub-pixels obtained by dividing each of the pixels Pix into sub-pixels of the first color, the second color, and the third color. In contrast, in the field-sequential system, since the pixel need not be divided into sub-pixels in such a manner, the resolution can be easily increased.

Figure 4:
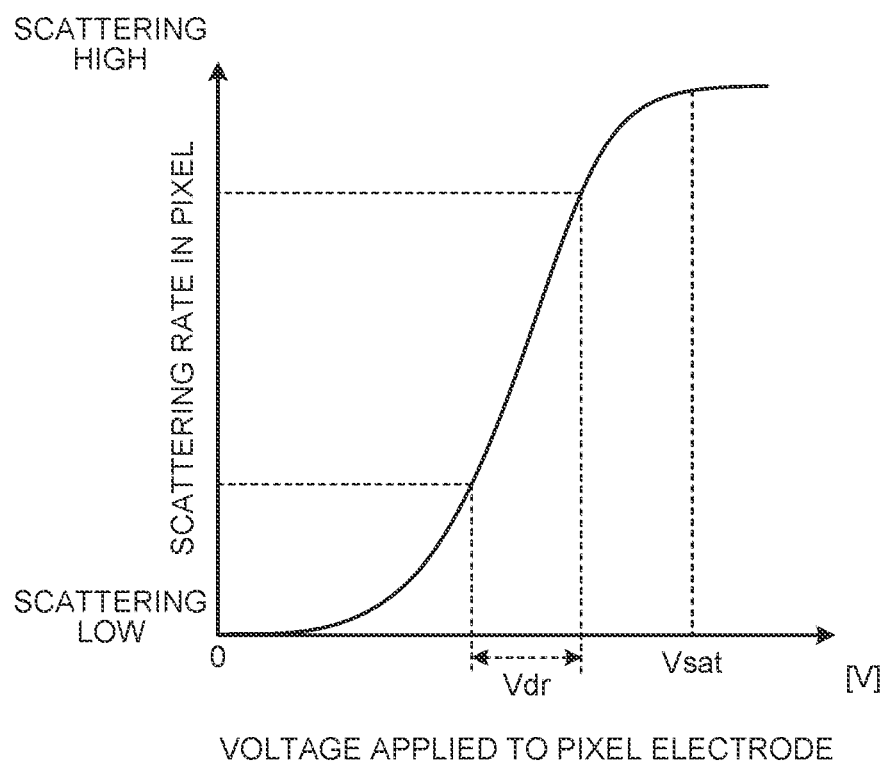
FIG. 4 is an explanatory diagram illustrating a relation between a voltage applied to a pixel electrode and a scattering state of a pixel.
Figure 6:
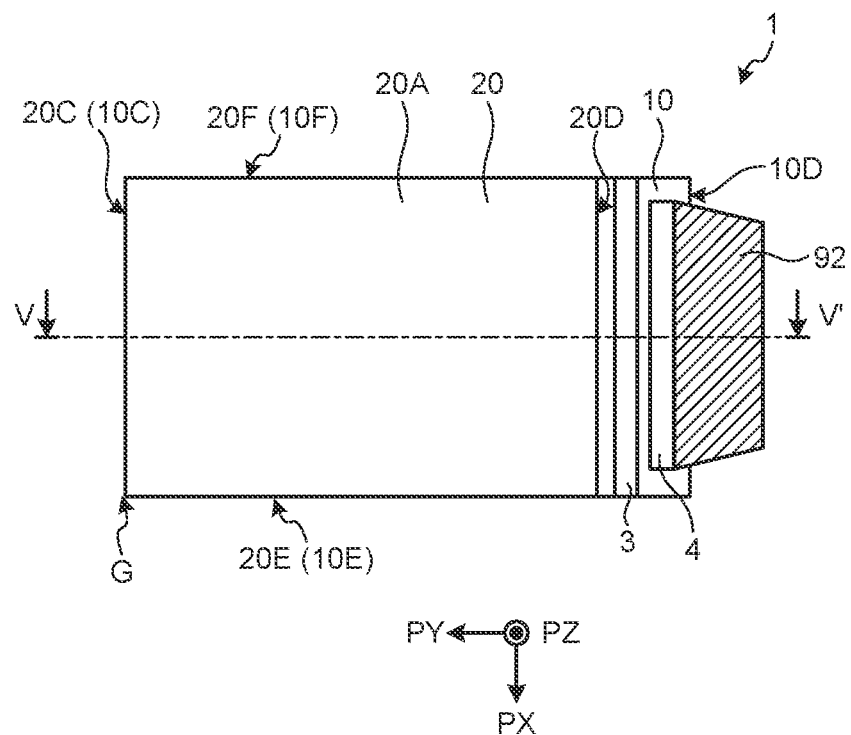
FIG. 6 is a plan view illustrating a planar surface of the display device of FIG. 1.
Figure 7:
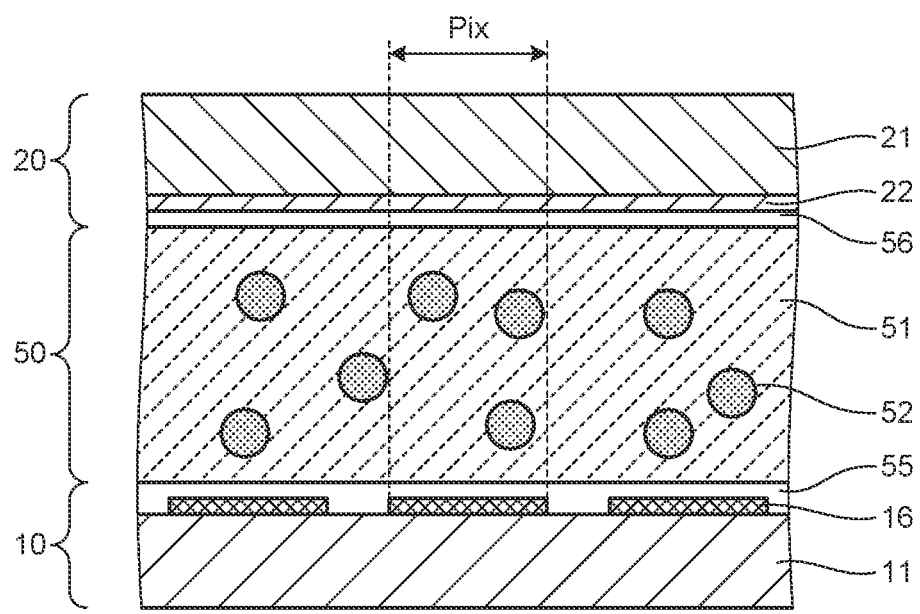
FIG. 7 is an enlarged sectional view obtained by enlarging a liquid crystal layer portion of FIG. 5.
Figure 8:
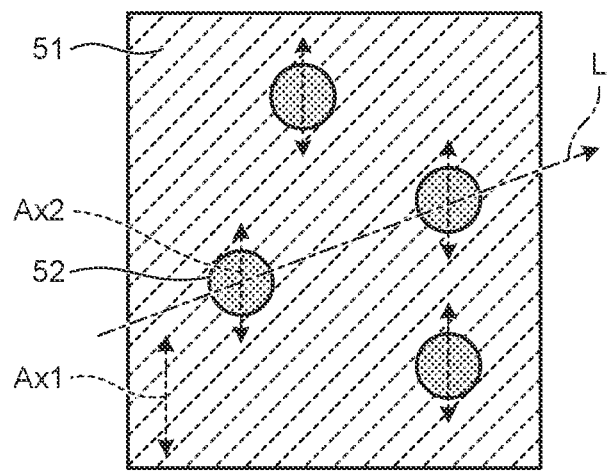
FIG. 8 is a sectional view for explaining a non-scattering state in the liquid crystal layer.
Figure 9:
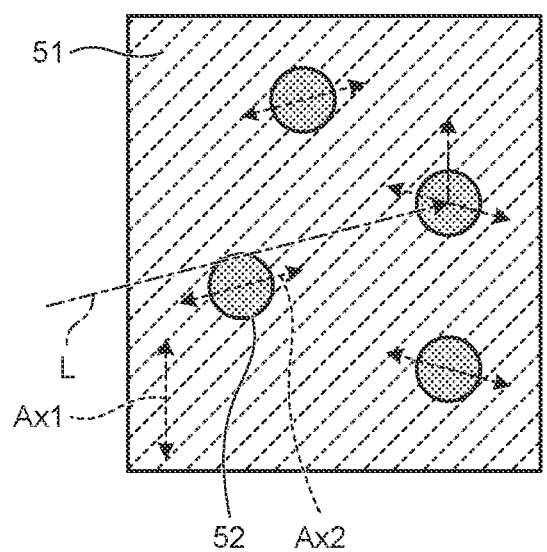
FIG. 9 is a sectional view for explaining the scattering state in the liquid crystal layer.

FIG. 4 is an explanatory diagram illustrating a relation between a voltage applied to the pixel electrode and a scattering state of the pixel. FIG. 5 is a sectional view illustrating an exemplary section of the display device of FIG. 1. FIG. 6 is a plan view illustrating a planar surface of the display device of FIG. 1. FIG. 5 illustrates a V-V section of FIG. 6. FIG. 7 is an enlarged sectional view obtained by enlarging the liquid crystal layer portion of FIG. 5. FIG. 8 is a sectional view for explaining a non-scattering state in the liquid crystal layer. FIG. 9 is a sectional view for explaining the scattering state in the liquid crystal layer.

If the gradation signal according to the output gradation value of each of the pixels Pix selected during one vertical scanning period GateScan is supplied to the above-described signal lines 13, the voltage applied to the pixel electrode 16 changes with the gradation signal. The change in the voltage applied to the pixel electrode 16 changes the voltage between the pixel electrode 16 and the common electrode 22. The scattering state of the liquid crystal layer 50 for each of the pixels Pix is controlled according to the voltage applied to the pixel electrode 16, and the scattering rate in the pixel Pix changes, as illustrated in FIG. 4.

As illustrated in FIG. 4, the change in the scattering rate in the pixel Pix is smaller when the voltage applied to the pixel electrode 16 is equal to or higher than a saturation voltage Vsat. Therefore, the drive circuit 4 changes the voltage applied to the pixel electrode 16 according to the vertical drive signal VDS in a voltage range Vdr lower than the saturation voltage Vsat.

As illustrated in FIGS. 5 and 6, the first light-transmitting substrate 10 has a first principal surface 10A, a second principal surface 10B, a first side surface 10C, a second side surface 10D, a third side surface 10E, and a fourth side surface 10F. The first principal surface 10A and the second principal surface 10B are parallel surfaces. The first side surface 10C and the second side surface 10D are parallel surfaces. The third side surface 10E and the fourth side surface 10F are parallel surfaces.

As illustrated in FIGS. 5 and 6, the second light-transmitting substrate 20 has a first principal surface 20A, a second principal surface 20B, a first side surface 20C, a second side surface 20D, a third side surface 20E, and a fourth side surface 20F. The first principal surface 20A and the second principal surface 20B are parallel surfaces. The first side surface 20C and the second side surface 20D are parallel surfaces. The third side surface 20E and the fourth side surface 20F are parallel surfaces.

As illustrated in FIGS. 5 and 6, the light emitters 31 are opposed to the second side surface 20D of the second light-transmitting substrate 20. As illustrated in FIG. 5, the light emitters 31 emit light-source light L to the second side surface 20D of the second light-transmitting substrate 20. The second side surface 20D of the second light-transmitting substrate 20 opposed to the light emitters 31 serves as a plane of light incidence.

As illustrated in FIG. 5, the light-source light L emitted from the light emitter 31 propagates in a direction away from the second side surface 20D while being reflected by the first principal surface 10A of the first light-transmitting substrate 10 and the first principal surface 20A of the second light-transmitting substrate 20. When the light-source light L travels outward from the first principal surface 10A of the first light-transmitting substrate 10 or the first principal surface 20A of the second light-transmitting substrate 20, the light-source light L enters a medium having a lower refractive index from a medium having a higher refractive index. Hence, if the angle of incidence of the light-source light L incident on the first principal surface 10A of the first light-transmitting substrate 10 or the first principal surface 20A of the second light-transmitting substrate 20 is larger than a critical angle, the light-source light L is fully reflected by the first principal surface 10A of the first light-transmitting substrate 10 or the first principal surface 20A of the second light-transmitting substrate 20.

As illustrated in FIG. 5, the light-source light L that has propagated in the first light-transmitting substrate 10 and the second light-transmitting substrate 20 is scattered by any of the pixels Pix including liquid crystals placed in the scattering state, and the angle of incidence of the scattered light becomes an angle smaller than the critical angle. Thus, emission light 68 or 68A is emitted outward from the first principal surface 20A of the second light-transmitting substrate 20 or the first principal surface 10A of the first light-transmitting substrate 10. The emission light 68 or 68A emitted outward from the first principal surface 20A of the second light-transmitting substrate 20 or the first principal surface 10A of the first light-transmitting substrate 10 is viewed by the viewer. The following describes the polymer dispersed liquid crystals placed in the scattering state and the polymer dispersed liquid crystals in the non-scattering state, using FIGS. 7 to 9.

As illustrated in FIG. 7, the first light-transmitting substrate 10 is provided with a first orientation film 55, and the second light-transmitting substrate 20 is provided with a second orientation film 56. The first and the second orientation films 55 and 56 are, for example, vertical orientation films.

A solution containing the liquid crystals and a monomer is filled between the first light-transmitting substrate 10 and the second light-transmitting substrate 20. Then, in a state where the monomer and the liquid crystals are oriented by the first and the second orientation films 55 and 56, the monomer is polymerized by ultraviolet rays or heat to form a bulk 51. This process forms the liquid crystal layer 50 including reverse-mode polymer dispersed liquid crystals in which the liquid crystals are dispersed in gaps of a polymer network formed in a mesh shape.

In this manner, the liquid crystal layer 50 includes the bulk 51 formed of the polymer and a plurality of fine particles 52 dispersed in the bulk 51. The fine particles 52 include the liquid crystals. Both the bulk 51 and the fine particles 52 have optical anisotropy.

The orientation of the liquid crystals included in the fine particles 52 is controlled by a voltage difference between the pixel electrode 16 and the common electrode 22. The orientation of the liquid crystals is changed by the voltage applied to the pixel electrode 16. The degree of scattering of light passing through the pixel Pix changes with change in the orientation of the liquid crystals.

For example, as illustrated in FIG. 8, the direction of an optical axis Ax1 of the bulk 51 is equal to the direction of an optical axis Ax2 of the fine particles 52 when no voltage is applied between the pixel electrode 16 and the common electrode 22. The optical axis Ax2 of the fine particles 52 is parallel to the PZ direction of the liquid crystal layer 50. The optical axis Ax1 of the bulk 51 is parallel to the PZ direction of the liquid crystal layer 50 regardless of whether the voltage is applied.

Ordinary-ray refractive indices of the bulk 51 and the fine particles 52 are equal to each other. When no voltage is applied between the pixel electrode 16 and the common electrode 22, the difference of refractive index between the bulk 51 and the fine particles 52 is zero in all directions. The liquid crystal layer 50 is placed in the non-scattering state of not scattering the light-source light L. The light-source light L propagates in a direction away from the light emitter 31 while being reflected by the first principal surface 10A of the first light-transmitting substrate 10 and the first principal surface 20A of the second light-transmitting substrate 20. When the liquid crystal layer 50 is in the non-scattering state of not scattering the light-source light L, a background on the first principal surface 20A side of the second light-transmitting substrate 20 is visible from the first principal surface 10A of the first light-transmitting substrate 10, and a background on the first principal surface 10A side of the first light-transmitting substrate 10 is visible from the first principal surface 20A of the second light-transmitting substrate 20.

As illustrated in FIG. 9, in the space between the pixel electrode 16 subjected to the voltage and the common electrode 22, the optical axis Ax2 of any of the fine particles 52 is inclined by an electric field generated between the pixel electrode 16 and the common electrode 22. Since the optical axis Ax1 of the bulk 51 is not changed by the electric field, the direction of the optical axis Ax1 of the bulk 51 differs from the direction of the optical axis Ax2 of the fine particles 52. The light-source light L is scattered in the pixel Pix including the pixel electrode 16 subjected to the voltage. As described above, the viewer views a part of the scattered light-source light L emitted outward from the first principal surface 10A of the first light-transmitting substrate 10 or the first principal surface 20A of the second light-transmitting substrate 20.

In the pixel Pix including the pixel electrode 16 not subjected to the voltage, the background on the first principal surface 20A side of the second light-transmitting substrate 20 is visible from the first principal surface 10A of the first light-transmitting substrate 10, and the background on the first principal surface 10A side of the first light-transmitting substrate 10 is visible from the first principal surface 20A of the second light-transmitting substrate 20. In the display device 1 of the present embodiment, when the first input signal VS is entered from the image output portion 91, the voltage is applied to the pixel electrode 16 of the pixel Pix for displaying an image, and the image based on the third input signal VCSA becomes visible together with the background.

The light-source light L is scattered in the pixel Pix including the pixel electrode 16 subjected to the voltage, and emitted outward to display the image, which is displayed so as to be superimposed on the background. In other words, the display device 1 of the present embodiment combines the emission light 68 or the emission light 68A with the background to display the image so as to be superimposed on the background.

Figure 10:
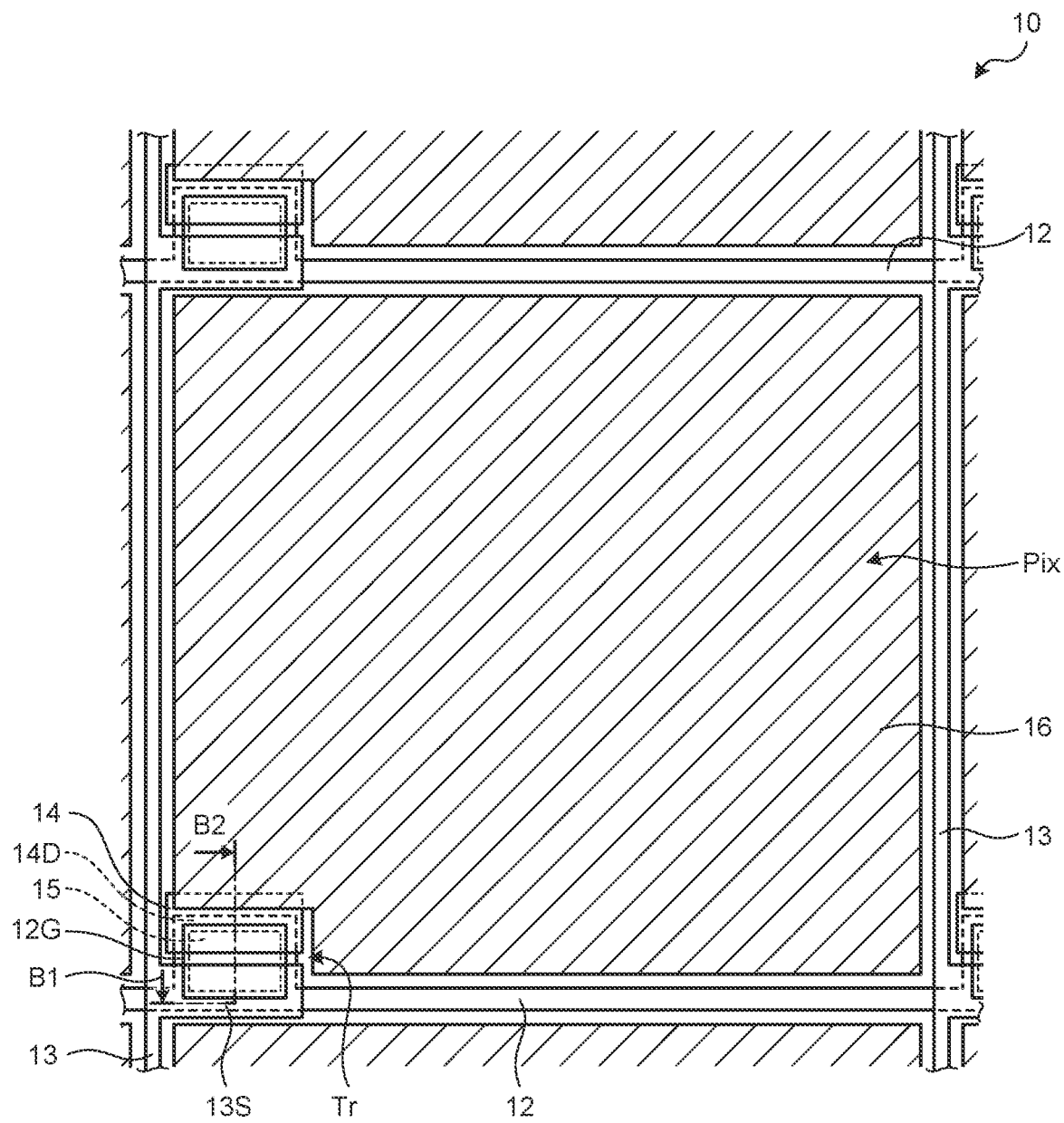
FIG. 10 is a plan view illustrating the pixel.
Figure 11:
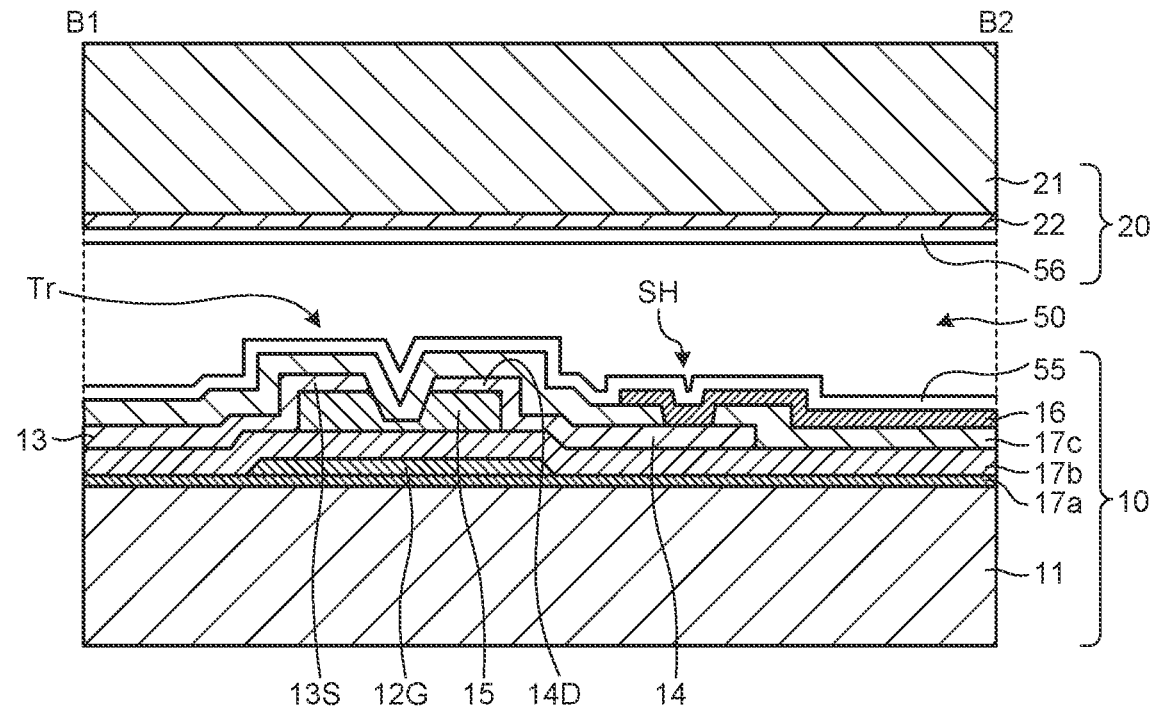
FIG. 11 is a sectional view along B1-B2 in FIG. 10.

FIG. 10 is a plan view illustrating the pixel. FIG. 11 is a sectional view along XI-XI' in FIG. 10. As illustrated in FIGS. 1, 2, and 10, the first light-transmitting substrate 10 is provided with the signal lines 13 and the scanning lines 12 so as to form a grid in the plan view. A region surrounded by the adjacent scanning lines 12 and the adjacent signal lines 13 corresponds to the pixel Pix. The pixel Pix is provided with the pixel electrode 16 and the switching element Tr. In the present embodiment, the switching element Tr is a bottom-gate thin film transistor. The switching element Tr includes a semiconductor layer 15 overlapping, in the plan view, with a gate electrode 12G electrically coupled to a corresponding one of the scanning lines 12.

The scanning lines 12 are wiring of a metal such as molybdenum (Mo) or aluminum (Al), a laminated body of these metals, or an alloy thereof. The signal lines 13 are wiring of a metal, such as aluminum, or an alloy thereof.

The semiconductor layer 15 is provided so as not to protrude from the gate electrode 12G in the plan view. As a result, the light-source light L traveling toward the semiconductor layer 15 from the gate electrode 12G side is reflected, and light leakage is less likely to occur in the semiconductor layer 15.

As illustrated in FIG. 10, a source electrode 13S electrically coupled to a corresponding one of the signal lines 13 overlaps with one end portion of the semiconductor layer 15 in the plan view.

As illustrated in FIG. 10, a drain electrode 14D is provided in a position adjacent to the source electrode 13S across a central portion of the semiconductor layer 15 in the plan view. The drain electrode 14D overlaps with the other end portion of the semiconductor layer 15 in the plan view. A portion overlapping with neither the source electrode 13S nor the drain electrode 14D serves as a channel of the switching element Tr. As illustrated in FIG. 11, conductive wiring 14 coupled to the drain electrode 14D is electrically coupled to the pixel electrode 16 at a through-hole SH.

As illustrated in FIG. 11, the first light-transmitting substrate 10 includes a first base material 11 made of, for example, glass. The first base material 11 may be made of a resin, such as polyethylene terephthalate, as long as having a light transmitting capability. The first base material 11 is provided thereon with a first insulating layer 17a, which is, in turn, provided thereon with the scanning line 12 and the gate electrode 12G. A second insulating layer 17b is provided so as to cover the scanning line 12. The first insulating layer 17a and the second insulating layer 17b are each made of, for example, a transparent inorganic insulating member, such as a silicon nitride member.

The semiconductor layer 15 is stacked on the second insulating layer 17b. The semiconductor layer 15 is made of, for example, amorphous silicon, but may be made of polysilicon or an oxide semiconductor.

The second insulating layer 17b is provided thereon with the source electrode 13S and the signal line 13 partially covering the semiconductor layer 15, the drain electrode 14D partially covering the semiconductor layer 15, and the conductive wiring 14. The drain electrode 14D is made of the same material as that of the signal line 13. A third insulating layer 17c is provided on the semiconductor layer 15, the signal lines 13, and the drain electrode 14D. The third insulating layer 17c is made of, for example, a transparent inorganic insulating member, such as a silicon nitride member.

The third insulating layer 17c is provided thereon with the pixel electrode 16. The pixel electrode 16 is made of a light-transmitting conductive member, such as an indium tin oxide (ITO) member. The pixel electrode 16 is electrically coupled to the conductive wiring 14 and the drain electrode 14D through contact holes provided in the third insulating layer 17c. The first orientation film 55 is provided on the pixel electrode 16.

The second light-transmitting substrate 20 includes a second base material 21 made of, for example, glass. The second base material 21 may be made of a resin, such as polyethylene terephthalate, as long as having a light transmitting capability. The second base material 21 is provided with the common electrode 22. The common electrode 22 is made of a light-transmitting conductive member, such as an ITO member. The second orientation film 56 is provided on a surface of the common electrode 22.

Figure 12:
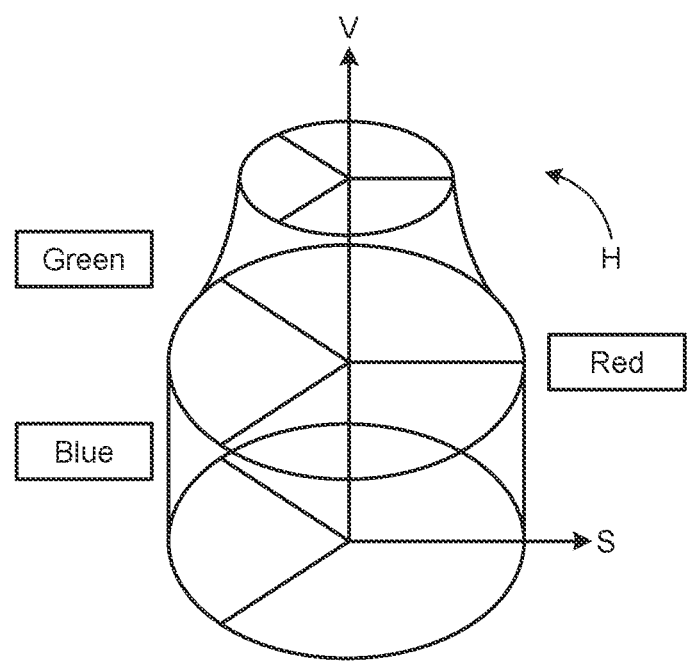
FIG. 12 is a conceptual diagram of an extended HSV (Hue-Saturation-Value, Value is also called Brightness) color space extendable by the display device according to the present embodiment.
Figure 13:
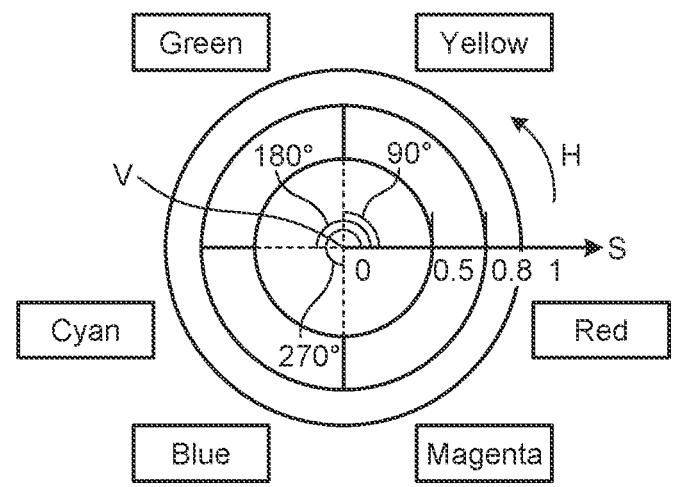
FIG. 13 is a conceptual diagram illustrating a relation between hue and saturation in the extended HSV color space.

FIG. 12 is a conceptual diagram of an extended HSV color space extendable by the display device according to the present embodiment. FIG. 13 is a conceptual diagram illustrating a relation between hue and saturation in the extended HSV color space. The input signal analyzer 411 externally receives the first input signal VS serving as information on an image to be displayed. The first input signal VS includes therein information for each of the pixels about an image (color) to be displayed in a position of the pixel.

The input signal analyzer 411 illustrated in FIG. 2 processes the first input signal VS to generate RGBW signals and outputs them to the signal adjuster 413.

The display device 1 has the fourth color light emission period WON so as to be capable of increasing a dynamic range of a value (also called brightness) in the HSV color space (extended HSV color space) illustrated in FIG. 12. The signal adjuster 413 reads an extension coefficient Z corresponding to the signal ELV of the external light information from the storage 412. In the first embodiment, the extension coefficient Z is a coefficient equal to or larger than one, as will be described later.

Figure 14:
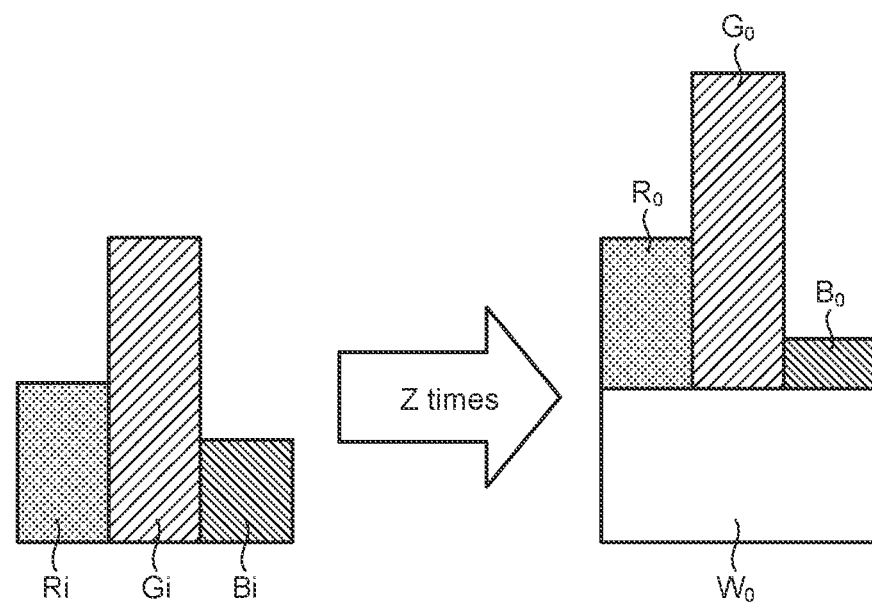
FIG. 14 is a diagram explaining a luminance increase by signal processing from an input signal value to an output signal value.

As illustrated in FIG. 14, the input signal analyzer 411 applies HSV transformation to RGB signals [$R_i$, $G_i$, $B_i$] of each of the pixels Pix included in the first input signal VS illustrated in FIG. 2, and calculates RGBW signals [$R_0$, $G_0$, $B_0$, $W_0$] of the pixel based on saturation S and the extension coefficient Z thus obtained.

Specifically, the input signal analyzer 411 calculates S=(Max−Min)/Max and V(S)=Max as the saturation S and the brightness V(S). The saturation S can have a value from zero to one. The brightness V(S) can have a value from zero to ($2^n-1$), where n is the number of display gradation bits.

Max is the maximum value of the gradation value $R_i$ of the first color, the gradation value $G_i$ of the second color, and the gradation value $B_i$ of the third color that are included in the first input signal VS and are each to be displayed by one of the pixels Pix. For example, in FIG. 14, the gradation value $G_i$ of the second color is Max.

Min is the minimum value of the gradation value $R_i$ of the first color, the gradation value $G_i$ of the second color, and the gradation value $B_i$ of the third color that are included in the first input signal VS and are each to be displayed by one of the pixels Pix. For example, in FIG. 14, the gradation value $B_i$ of the third color is Min.

Hue H is represented as 0 degrees to 360 degrees as illustrated in FIG. 13. The hue changes from 0 degrees toward 360 degrees in the order of red, yellow, green, cyan, blue, magenta, and red.

Figure 15:
FIG. 15 is a diagram illustrating an example in which an extension coefficient is kept constant with respect to a change in saturation.

In the first embodiment, the extension coefficient Z is stored in the storage 412. As described above, if the signal ELV of the external light information is equal to or larger than a threshold, or is in any one of the sunlit clear sky mode (first environment mode), the sunlit cloudy sky mode (second environment mode), and the indoor use mode (third environment mode), the extension coefficient Z is larger than one and is a constant value regardless of the level of the saturation S. For example, as illustrated in FIG. 15, the extension coefficient Z is two regardless of the level of the saturation S.

If the signal ELV of the external light information is smaller than the threshold, or is in the night use mode (fourth environment mode), the extension coefficient Z is one.

Thus, the extension coefficient Z is larger than one if the influence of the external light 69 is larger, or if the influence of the external light 69 is set as larger.

The storage 412 stores therein a luminance increase ratio $\chi$ of the fourth color in the light emitters 31. The luminance increase ratio $\chi$ is a value obtained by dividing luminance obtained by simultaneously driving the light emitter 33R of the first color, the light emitter 33G of the second color, and the light emitter 33B of the third color at a predetermined PWM duty cycle by an average of luminance obtained by individually driving the light emitter 33R of the first color, the light emitter 33G of the second color, and the light emitter 33B of the third color at the same PWM duty cycle.

When $\chi$ denotes a constant depending on the display device, the input signal analyzer 411 obtains the RGBW signals [$R_0$, $G_0$, $B_0$, $W_0$] of each of the pixels based on Expressions (1) to (4) given below.

$$R_0 = Z \cdot R_i - \chi W_0 \quad (1)$$

$$G_0 = Z \cdot G_i - \chi W_0 \quad (2)$$

$$B_0 = Z \cdot B_i - \chi W_0 \quad (3)$$

$$W_0 = \text{Min} \cdot Z/\chi \quad (4)$$

In this manner, each of the gradation value $R_0$ of the first color, the gradation value $G_0$ of the second color, and the gradation value $B_0$ of the third color included in the second input signal VCS is obtained based on a function of the extension coefficient Z equal to or larger than one, and a corresponding one of the gradation value $R_i$ of the first color, the gradation value $G_i$ of the second color, and the gradation value $B_i$ of the third color included in the first input signal VS.

The gradation value $W_0$ of the fourth color included in the second input signal VCS is obtained based on a function of the extension coefficient Z, the luminance increase ratio $\chi$ of the fourth color in the light emitters 31, and the minimum value Min of the gradation value $R_i$ of the first color, the gradation value $G_i$ of the second color, and the gradation value $B_i$ of the third color included in the first input signal VS.

The extension coefficient Z makes the gradation value $R_0$ of the first color, the gradation value $G_0$ of the second color, and the gradation value $B_0$ of the third color more easily visible than direct display of the gradation value $R_i$ of the first color, the gradation value $G_i$ of the second color, and the gradation value $B_i$ of the third color, because the gradation value $W_0$ of the fourth color is present.

The input signal analyzer 411 may calculate the RGBW signals [$R_0$, $G_0$, $B_0$, $W_0$] of each of the pixels from the RGB signals [$R_i$, $G_i$, $B_i$] of a corresponding one of the pixels included in the first input signal VS illustrated in FIG. 2 based on the extension coefficient Z without applying the HSV transformation.

The signal adjuster 413 generates the third input signal VCSA from the second input signal VCS. The third input signal VCSA has gradation values [$R_1$, $G_1$, $B_1$, $W_1$] proportional to the gradation values [$R_0$, $G_0$, $B_0$, $W_0$], respectively, of the second input signal VCS.

Figure 16:
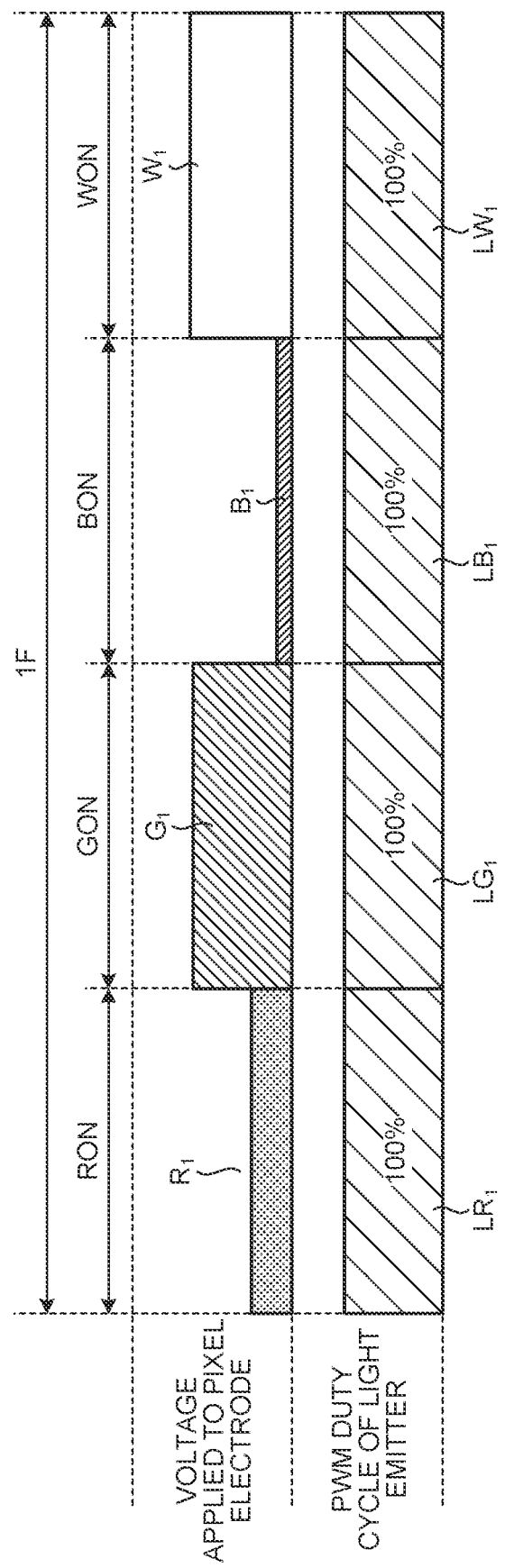
FIG. 16 illustrates an example of the voltage applied to the pixel electrode and a pulse width modulation (PWM) duty cycle of each of light emitters during a period of one frame in one pixel according to the first embodiment.

FIG. 16 illustrates an example of the voltage applied to the pixel electrode and the PWM duty cycle of each of the light emitters during the period of one frame in one of the pixels according to the first embodiment. As illustrated in FIG. 16, the PWM duty cycles of the light emitters 31 during the first color light emission period RON, the second color light emission period GON, the third color light emission period BON, and the fourth color light emission period WON are the same as one another.

The maximum gradation among gradations of the first color, the second color, and the third color that are included in the second input signal VCS and are each to be displayed by one of the pixels Pix has a gradation value $G_1$. The voltage applied to the pixel electrode 16 by the gradation value $G_1$ is lower than the saturation voltage Vsat at which the change in the scattering rate in the pixel Pix becomes smaller as the applied voltage increases. Therefore, the drive circuit 4 is not limited by an output range. The drive circuit 4 can apply a voltage within an upper limit to the pixel electrode 16.

The signal adjuster 413 also generates the light source control signal LCSA. The light emitter 33R of the first color, the light emitter 33G of the second color, the light emitter 33B of the third color, and the light emitter 33W of the fourth color are driven at a PWM duty cycle of 100% based on gradation values [$LR_1$, $LG_1$, $LB_1$, $LW_1$] of the light source control signal LCSA.

The voltage applied to the pixel electrode during the first color light emission period RON, the second color light emission period GON, the third color light emission period BON, and the fourth color light emission period WON is proportional to the gradation value $R_0$ of the first color, the gradation value $G_0$ of the second color, the gradation value $B_0$ of the third color, and the gradation value $W_0$ of the fourth color.

As described above, in each of the light emitters 31, any one of the first color, the second color, the third color, and the fourth color emits light in the field-sequential system. The drive circuit 4 converts the received first input signal VS into the second input signal VCS based on the RGB signals [$R_i$, $G_i$, $B_i$] of the first color, the second color, and the third color that are included in the first input signal VS and are each to be displayed by a corresponding one of the pixels. The gradation values [$R_0$, $G_0$, $B_0$, $W_0$] of the second input signal VCS are gradation values of the first color, the second color, the third color, and the fourth color, respectively.

As a result, the fourth color having higher luminance than that of the first color, the second color, and the third color emits light, so that the display device 1 improves the visibility.

Modification of First Embodiment

Figure 17:
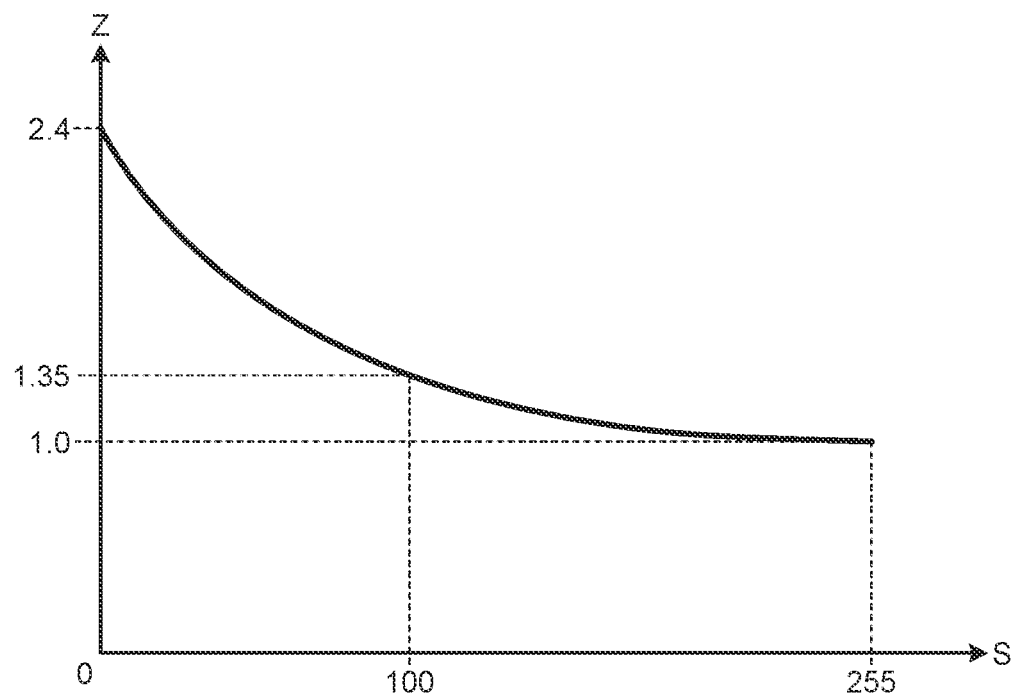
FIG. 17 is a diagram illustrating an example in which the extension coefficient changes with a change in saturation.

FIG. 17 is a diagram illustrating an example in which the extension coefficient changes with a change in saturation. As illustrated in FIG. 17, the extension coefficient Z is smaller as a signal value for the saturation S is larger, and the extension coefficient Z is larger as the signal value for the saturation S is smaller. That is, the extension coefficient Z decreases as the saturation S increases.

$$Z(S) = V\max(S)/V(S) \tag{5}$$

The input signal analyzer 411 stores, in the storage 412, the value of a maximum value Vmax(S) of the brightness at coordinates (coordinate values) of the saturation and the hue illustrated in FIG. 13. The saturation S is calculated by Expression (6) below. The brightness V(S) is calculated by Expression (7) below.

$$S = 255(1 - \text{Min}/\text{Max}) \tag{6}$$

$$V(S) = (\text{Max}/255)^{2.2} \tag{7}$$

In the modification of the first embodiment, the display device 1 and a driving method thereof can increase the luminance while reducing the degradation of display quality by making the extension coefficient Z a function of Max, Min of the input signal as given by Expression (5) above.

Second Embodiment

Figure 18:
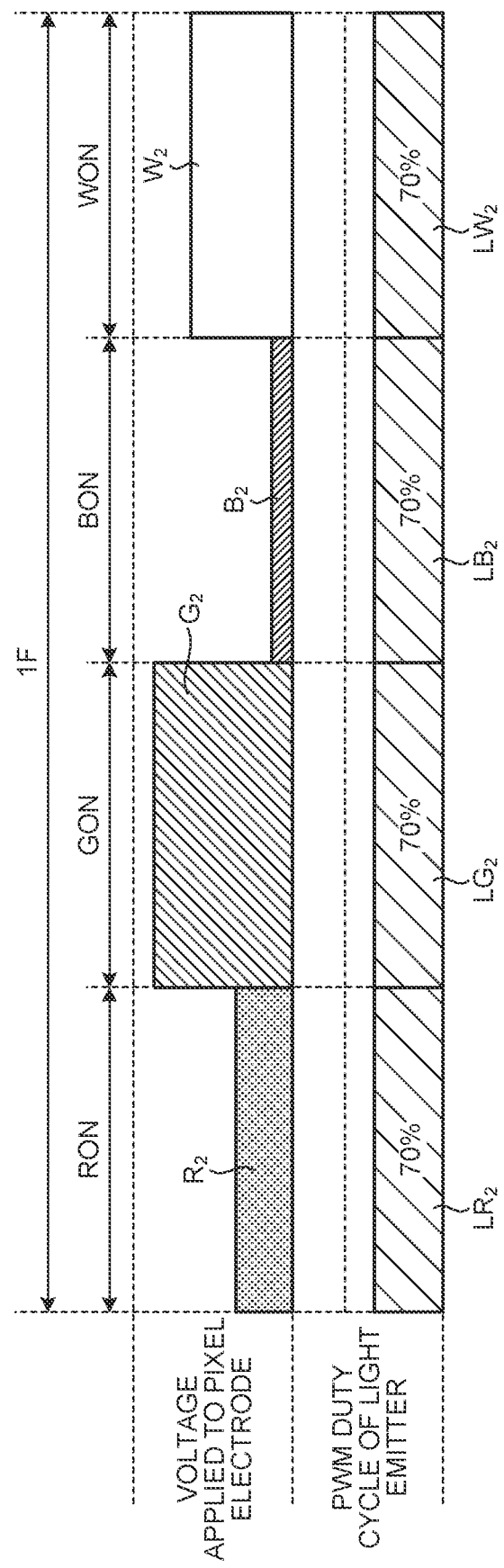
FIG. 18 illustrates an example of the voltage applied to the pixel electrode and the PWM duty cycle of each of the light emitters during the period of one frame in one pixel according to a second embodiment.

FIG. 18 illustrates an example of the voltage applied to the pixel electrode and the PWM duty cycle of each of the light emitters during the period of one frame in one of the pixels according to a second embodiment. The same components as those described in the above-described embodiment are denoted by the same reference numerals, and the description thereof will not be repeated.

The storage 412 stores therein the luminance increase ratio $\chi$ of the fourth color in the light emitters 31. In the second embodiment, the luminance increase ratio $\chi$ is a value obtained by dividing luminance of a light emitter 33W of the fourth color at a predetermined PWM duty cycle by the average of the luminance obtained by individually driving the light emitter 33R of the first color, the light emitter 33G of the second color, and the light emitter 33B of the third color at the same PWM duty cycle.

The storage 412 stores therein the maximum value Vmax(S) of the brightness based on the saturation S as a variable in the HSV color space extended by adding the fourth color as illustrated in FIG. 12, as, for example, a kind of lookup table. Alternatively, the input signal analyzer 411 obtains the maximum value Vmax(S) of the brightness based on the saturation S as a variable in the extended HSV color space each time the necessity arises.

First Step

First, the input signal analyzer 411 obtains the saturation S and the brightness V(S) in the pixel Pix based on the first input signal VS for the pixel Pix. The input signal analyzer 411 performs this processing on all the pixels Pix.

Second Step

Then, the input signal analyzer 411 obtains an extension coefficient α(S) based on Vmax(S)/V(S) obtained in each of the pixels Pix based on Expression (8) below.

$$\alpha(S)=V\max(S)/V(S) \tag{8}$$

The storage 412 stores therein a limit value β in advance. The extension coefficient α(S) is determined as the extension coefficient Z such that a ratio of the number of pixels in which a value of the extended brightness obtained from a product of the brightness V(S) and the extension coefficient α(S) exceeds the maximum value Vmax(S) to the number of all the pixels is equal to or smaller than the limit value β.

Third Step

Then, the input signal analyzer 411 obtains the gradation value $W_0$ based on Expression (4) given above. The input signal analyzer 411 obtains the gradation values $W_0$ in all the pixels Pix.

Fourth Step

Then, the input signal analyzer 411 obtains the gradation values $R_0$, $G_0$, and $B_0$ in each of the pixels Pix based on Expressions (1), (2), and (3) given above.

Here, the PWM duty cycle of each of the light emitters 31 during the first color light emission period RON, the second color light emission period GON, the third color light emission period BON, and the fourth color light emission period WON is reduced by a factor of (1/Z).

In the second embodiment, the signal adjuster 413 generates the light source control signal LCSA such that the factor (1/Z) is a PWM duty cycle of 70%. The drive circuit 4 drives the light emitter 33R of the first color, the light emitter 33G of the second color, and the light emitter 33B of the third color at a PWM duty cycle of 70% based on signal values [$LR_2$, $LG_2$, $LB_2$, $LW_2$] of this light source control signal LCSA.

The signal adjuster 413 generates the third input signal VCSA from the second input signal VCS. The gradation values [$R_0$, $G_0$, $B_0$, $W_0$] of the second input signal VCS are equal to gradation values [$R_2$, $G_2$, $B_2$, $W_2$] in the third input signal VCSA.

Each of the light emitters 31 is driven at a PWM duty cycle proportional to a reciprocal of the extension coefficient Z. In this manner, the drive circuit 4 drives the light emitter 33R of the first color, the light emitter 33G of the second color, and the light emitter 33B of the third color at a uniformly reduced PWM duty cycle. Therefore, lower power consumption is achieved.

Third Embodiment

Figure 19:
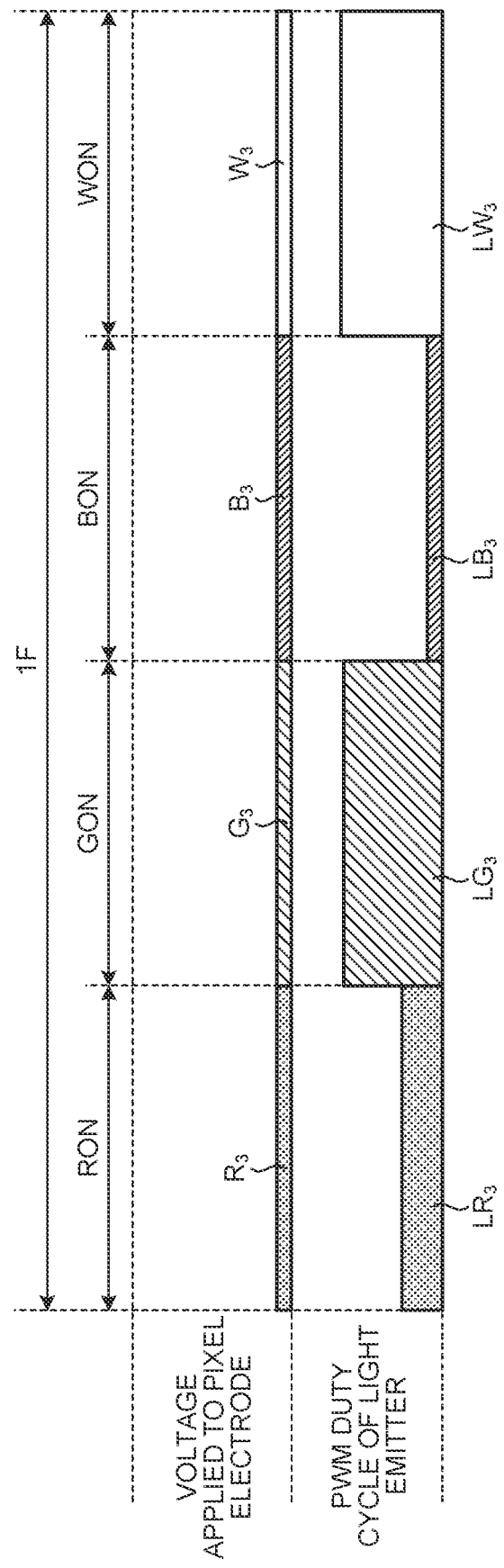
FIG. 19 illustrates an example of the voltage applied to the pixel electrode and the PWM duty cycle of each of the light emitters during the period of one frame in one pixel according to a third embodiment.

FIG. 19 illustrates an example of the voltage applied to the pixel electrode and the PWM duty cycle of each of the light emitters during the period of one frame in one of the pixels according to a third embodiment. The same components as those described in any one of the above-described embodiments are denoted by the same reference numerals, and the description thereof will not be repeated. As illustrated in FIG. 19, the PWM duty cycles of the light emitters 31 during the first color light emission period RON, the second color light emission period GON, the third color light emission period BON, and the fourth color light emission period WON differ from one another.

The signal adjuster 413 identifies a gradation value that is not zero and is minimum of the gradation values [$R_0$, $G_0$, $B_0$] as a reference value. In the third embodiment, the gradation value $B_0$ is the reference value. Then, the signal adjuster 413 calculates gradation values [$R_3$, $G_3$, $B_3$, $W_3$] of the third input signal VCSA so as to be the following values as given by Expression (9) below.

$$R_3=G_3=B_3=W_3=B_0 \tag{9}$$

Then, the signal adjuster 413 generates the light source control signal LCSA based on the gradation values [$R_0$, $G_0$, $B_0$, $W_0$] of the second input signal VCS. When LS denotes a reference PWM duty cycle, signal values [$LR_3$, $LG_3$, $LB_3$, $LW_3$] of the light source control signal LCSA are generated as signal values [$LS \times R_0/B_0$, $LS \times G_0/B_0$, $LS \times B_0/B_0$, $LS \times W_0/B_0$].

As described above, the drive circuit 4 or the analyzer 41 selects, as the reference value, the gradation value of one of the first color, the second color, and the third color that are included in the second input signal VCS and are each to be displayed by one of the pixels Pix. During the first color light emission period RON, the second color light emission period GON, the third color light emission period BON, and the fourth color light emission period WON, the voltage is applied to the pixel electrode 16 that is a certain first electrode based on the gradation value $B_0$ that is the above-described reference value.

During the first color light emission period RON, the light emitters 31 are controlled at a pulse width modulation duty cycle proportional to a coefficient obtained by dividing the gradation value $R_0$ of the first color by the gradation value $B_0$ that is the reference value. The gradation value $R_0$ of the first color is included in the second input signal VCS and is to be displayed by one of the pixels Pix.

During the second color light emission period GON, the light emitters 31 are controlled at a pulse width modulation duty cycle proportional to a coefficient obtained by dividing the gradation value $G_0$ of the second color by the gradation value $B_0$ that is the reference value. The gradation value $G_0$ of the second color is included in the second input signal VCS and is to be displayed by one of the pixels Pix.

During the third color light emission period BON, the light emitters 31 are controlled at a pulse width modulation duty cycle proportional to a coefficient obtained by dividing the gradation value $B_0$ of the third color by the gradation value $B_0$ that is the reference value. The gradation value $B_0$ of the third color is included in the second input signal VCS and is to be displayed by one of the pixels Pix.

During the fourth color light emission period WON, the light emitters 31 are controlled at a pulse width modulation duty cycle proportional to a coefficient obtained by dividing the gradation value $W_0$ of the fourth color by the gradation value $B_0$ that is the reference value. The gradation value $W_0$ of the fourth color is included in the second input signal VCS and is to be displayed by one of the pixels Pix.

As a result, a constant voltage is applied to the pixel electrode 16 during one frame, so that the drive frequency of the voltage applied to the pixel electrode 16 can be reduced.

Fourth Embodiment

Figure 20:
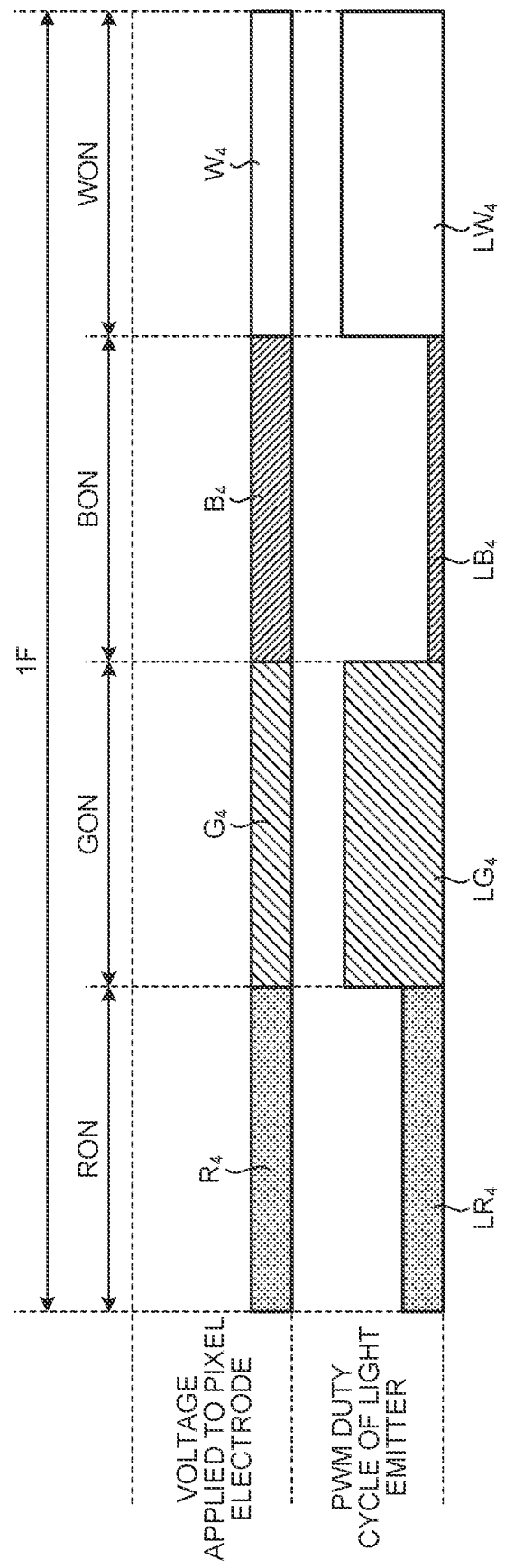
FIG. 20 illustrates an example of the voltage applied to the pixel electrode and the PWM duty cycle of each of the light emitters during the period of one frame in one pixel according to a fourth embodiment.

FIG. 20 illustrates an example of the voltage applied to the pixel electrode and the PWM duty cycle of each of the light emitters during the period of one frame in one of the pixels according to a fourth embodiment. The same components as those described in any one of the above-described embodiments are denoted by the same reference numerals, and the description thereof will not be repeated. As illustrated in FIG. 20, the PWM duty cycles of the light emitters 31 during the first color light emission period RON, the second color light emission period GON, the third color light emission period BON, and the fourth color light emission period WON differ from one another.

The signal adjuster 413 identifies a gradation value that is not zero and is a second largest gradation value (intermediate gradation value) among the gradation values [$R_0$, $G_0$, $B_0$] as the reference value. In the fourth embodiment, the gradation value $R_0$ is the reference value. Then, the signal adjuster 413 calculates gradation values [$R_4$, $G_4$, $B_4$, $W_4$] of the third input signal VCSA so as to be the following values as given by Expression (10) below.

$$R_4 = G_4 = B_4 = W_4 = R_0 \tag{10}$$

Then, the signal adjuster 413 generates the light source control signal LCSA based on the gradation values [$R_0$, $G_0$, $B_0$, $W_0$] of the second input signal VCS. When LS denotes the reference PWM duty cycle, signal values [$LR_4$, $LG_4$, $LB_4$, $LW_4$] of the light source control signal LCSA are generated as signal values [$LS \times R_0/R_0$, $LS \times G_0/R_0$, $LS \times B_0/R_0$, $LS \times W_0/R_0$].

As described above, the drive circuit 4 or the analyzer 41 selects, as the reference value, the gradation value of one of the first color, the second color, and the third color that are included in the second input signal VCS and are each to be displayed by one of the pixels Pix. During the first color light emission period RON, the second color light emission period GON, the third color light emission period BON, and the fourth color light emission period WON, the voltage is applied to the pixel electrode 16 that is the certain first electrode based on the gradation value $R_0$ that is the above-described reference value.

During the first color light emission period RON, the light emitters 31 are controlled at a pulse width modulation duty cycle proportional to a coefficient obtained by dividing the gradation value $R_0$ of the first color by the gradation value $R_0$ that is the reference value. The gradation value $R_0$ of the first color is included in the second input signal VCS and is to be displayed by one of the pixels Pix.

During the second color light emission period GON, the light emitters 31 are controlled at a pulse width modulation duty cycle proportional to a coefficient obtained by dividing the gradation value $G_0$ of the second color by the gradation value $R_0$ that is the reference value. The gradation value $G_0$ of the second color is included in the second input signal VCS and is to be displayed by one of the pixels Pix.

During the third color light emission period BON, the light emitters 31 are controlled at a pulse width modulation duty cycle proportional to a coefficient obtained by dividing the gradation value $B_0$ of the third color by the gradation value $R_0$ that is the reference value. The gradation value $B_0$ of the third color is included in the second input signal VCS and is to be displayed by one of the pixels Pix.

During the fourth color light emission period WON, the light emitters 31 are controlled at a pulse width modulation duty cycle proportional to a coefficient obtained by dividing the gradation value $W_0$ of the fourth color by the gradation value $R_0$ that is the reference value. The gradation value $W_0$ of the fourth color is included in the second input signal VCS and is to be displayed by one of the pixels Pix.

As a result, the constant voltage is applied to the pixel electrode 16 during one frame, so that the drive frequency of the voltage applied to the pixel electrode 16 can be reduced.

Fifth Embodiment

Figure 21:
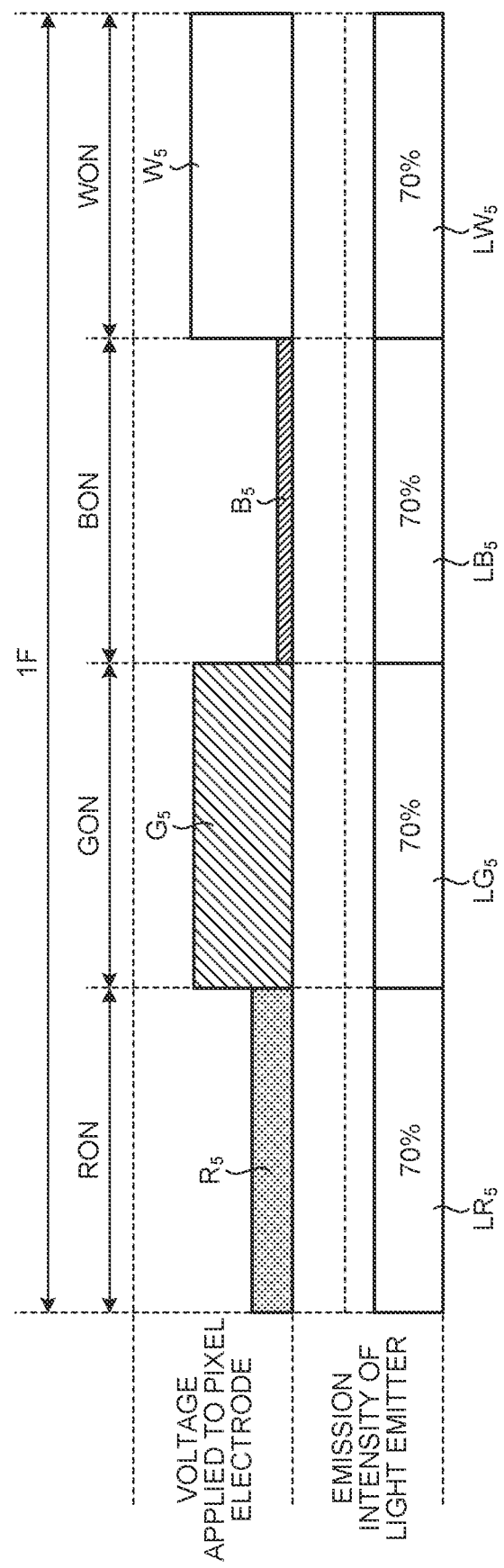
FIG. 21 illustrates an example of the voltage applied to the pixel electrode and an emission intensity of each of the light emitters during the period of one frame in one pixel according to a fifth embodiment.

FIG. 21 illustrates an example of the voltage applied to the pixel electrode and an emission intensity of each of the light emitters during the period of one frame in one of the pixels according to a fifth embodiment. The same components as those described in any one of the above-described embodiments are denoted by the same reference numerals, and the description thereof will not be repeated. As illustrated in FIG. 21, the PWM duty cycles of the light emitters 31 during the first color light emission period RON, the second color light emission period GON, the third color light emission period BON, and the fourth color light emission period WON are at 100%, and the emission intensity is at the same percentage of 70% through all the periods.

The maximum gradation among gradations of the first color, the second color, and the third color that are included in the second input signal VCS and are each to be displayed by one of the pixels Pix has the gradation value $G_1$. The voltage applied to the pixel electrode 16 by the gradation value $G_1$ is lower than the saturation voltage Vsat at which the change in the scattering rate in the pixel Pix becomes smaller as the applied voltage increases. Therefore, the drive circuit 4 is not limited by an output range. The drive circuit 4 can apply a voltage within an upper limit to the pixel electrode 16.

The signal adjuster 413 generates the light source control signal LCSA. The drive circuit 4 drives the light emitter 33R of the first color, the light emitter 33G of the second color, and the light emitter 33B of the third color at a PWM duty cycle of 70% based on the signal values [$LR_2$, $LG_2$, $LB_2$, $LW_2$] of this light source control signal LCSA.

The signal adjuster 413 generates the third input signal VCSA from the second input signal VCS. The third input signal VCSA has gradation values [$R_5$, $G_5$, $B_5$, $W_5$] proportional to the gradation values [$R_0$, $G_0$, $B_0$, $W_0$], respectively, of the second input signal VCS. The gradation values [$R_5$, $G_5$, $B_5$, $W_5$] are 100/70 times the gradation values [$R_0$, $G_0$, $B_0$, $W_0$].

The voltage applied to the pixel electrode during the first color light emission period RON, the second color light emission period GON, the third color light emission period BON, and the fourth color light emission period WON is proportional to the gradation value $R_0$ of the first color, the gradation value $G_0$ of the second color, the gradation value $B_0$ of the third color, and the gradation value $W_0$ of the fourth color.

Sixth Embodiment

Figure 22:
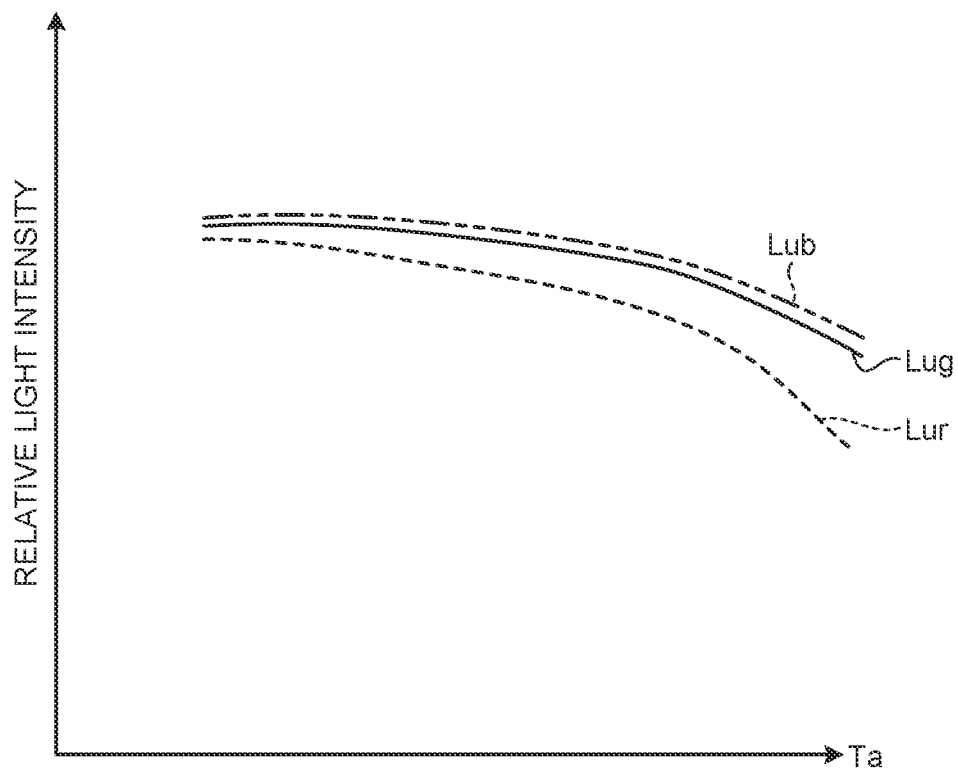
FIG. 22 illustrates exemplary temperature characteristics of the light emitters in a sixth embodiment.
Figure 23:
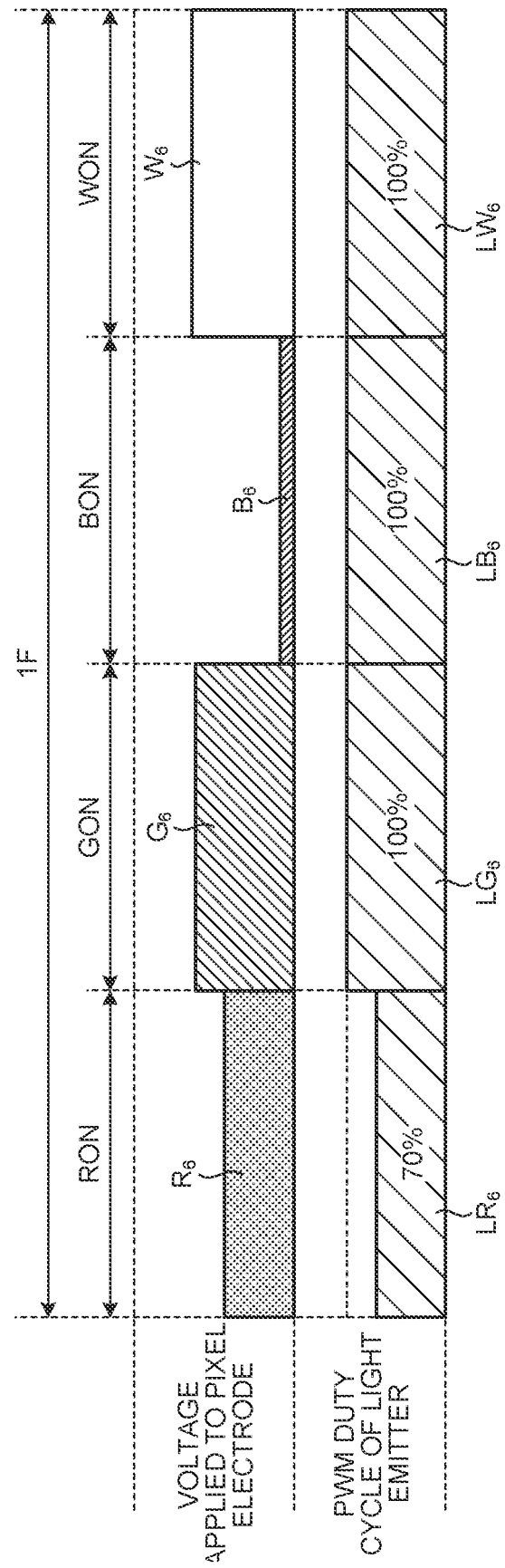
FIG. 23 illustrates an example of the voltage applied to the pixel electrode and the PWM duty cycle of each of the light emitters during the period of one frame in one pixel according to the sixth embodiment.

FIG. 22 illustrates exemplary temperature characteristics of the light emitters in a sixth embodiment. FIG. 23 illustrates an example of the voltage applied to the pixel electrode and the PWM duty cycle of each of the light emitters during the period of one frame in one of the pixels according to the sixth embodiment. The same components as those described in any one of the above-described embodiments are denoted by the same reference numerals, and the description thereof will not be repeated. As illustrated in FIG. 22, the light emitter 33R of the first color has a temperature characteristic different from those of the light emitter 33G of the second color and the light emitter 33B of the third color. This is because the main material of the light emitter 33R of the first color is aluminum indium gallium phosphide (AlInGaP) whereas the main material of the light emitter 33G of the second color and the light emitter 33B of the third color is gallium nitride (GaN).

The signal adjuster 413 generates the light source control signal LCSA. The drive circuit 4 drives the light emitter 33R of the first color at a PWM duty cycle lower than that of the light emitter 33G of the second color and the light emitter 33B of the third color based on signal values [$LR_6$, $LG_6$, LB$_6$, LW$_6$] of this light source control signal LCSA. For example, the drive circuit 4 drives the light emitter 33R of the first color at a PWM duty cycle of 70%, and drives the light emitter 33G of the second color and the light emitter 33B of the third color at a PWM duty cycle of 100%.

The signal adjuster 413 generates the third input signal VCSA from the second input signal VCS. The third input signal VCSA has gradation values [R$_6$, G$_6$, B$_6$, W$_6$] that have relations given by Expressions (11) to (14) below with respect to the gradation values [R$_0$, G$_0$, B$_0$, W$_0$] of the second input signal VCS.

$$R_6 = 100/70 \times R_0 \tag{11}$$

$$G_6 = G_0 \tag{12}$$

$$B_6 = B_0 \tag{13}$$

$$W_6 = W_0 \tag{14}$$

Since the gradation value R$_6$ of the first color is larger than the gradation value R$_0$ of the first color, the PWM duty cycle of the light emitter 33R of the first color is set lower. The light emitter 33R of the first color has a temperature characteristic in which a relative light intensity decreases more with increase in a heating temperature Ta than in the cases of the light emitter 33G of the second color and the light emitter 33B of the third color. The light emitter 33R of the first color is driven in a state where the PWM duty cycle is multiplied by a coefficient smaller than those of the light emitter 33G of the second color and the light emitter 33B of the third color. As a result, the heat generation of the light emitter 33R of the first color is reduced, and the decrease in the relative light intensity caused by the temperature rise is restrained.

Seventh Embodiment

Figure 24:
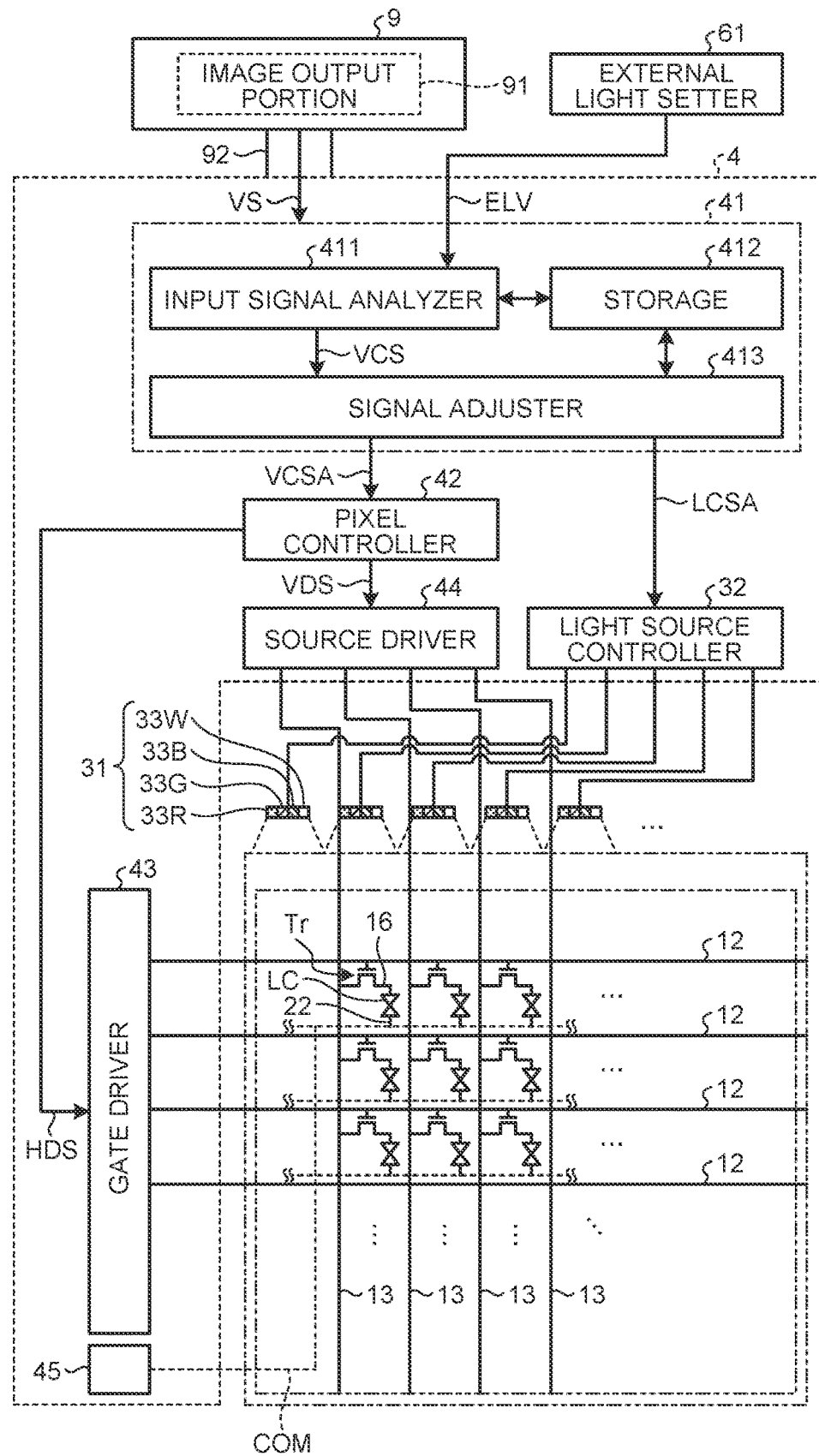
FIG. 24 is a block diagram illustrating a display device according to a seventh embodiment.

FIG. 24 is a block diagram illustrating a display device according to a seventh embodiment. The same components as those described in any one of the above-described embodiments are denoted by the same reference numerals, and the description thereof will not be repeated. As illustrated in FIG. 24, each of the light emitters 31 includes the light emitter 33R of the first color, the light emitter 33G of the second color, the light emitter 33B of the third color, and the light emitter 33W of the fourth color (such as a white color).

As illustrated in FIG. 3, during the fourth sub-frame (fourth predetermined time) WF, the light emitter 33W of the fourth color emits light during the fourth color light emission period WON, and some of the pixels Pix selected during the one vertical scanning period GateScan scatter light to perform display. On the entire display panel 2, if the gradation signal corresponding to the output gradation value of each of the pixels Pix selected during the one vertical scanning period GateScan is supplied to a corresponding one of the above-described signal lines 13, only the fourth color is lit up during the fourth color light emission period WON.

The light source controller 32 controls the light emitter 33R of the first color, the light emitter 33G of the second color, the light emitter 33B of the third color, and the light emitter 33W of the fourth color so as to emit light in a time-division manner based on the light source control signal LCSA. In this manner, the light emitter 33R of the first color, the light emitter 33G of the second color, the light emitter 33B of the third color, and the light emitter 33W of the fourth color are driven based on the field-sequential system.

The display device of the seventh embodiment can also be applied to the first to the sixth embodiments described above. In addition, the display device of the seventh embodiment can also be applied to other embodiments described below.

Eighth Embodiment

Figure 25:
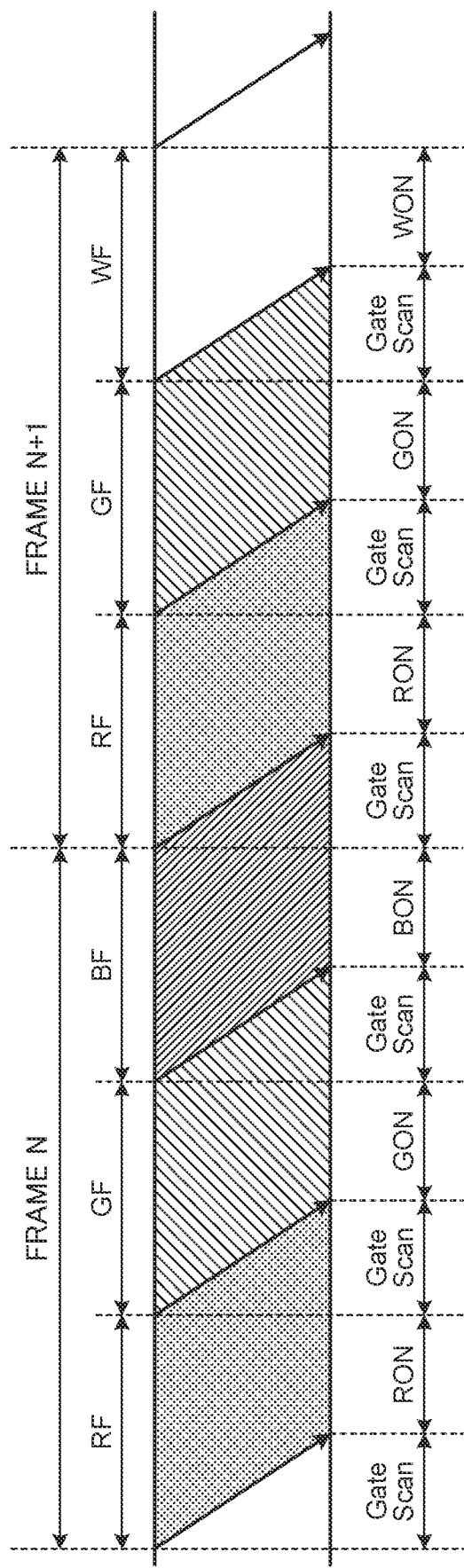
FIG. 25 is a timing diagram explaining the timing of the light emission by the light source in the field-sequential system according to an eighth embodiment.

FIG. 25 is a timing diagram explaining the timing of the light emission by the light source in the field-sequential system according to an eighth embodiment. The same components as those described in any one of the above-described embodiments are denoted by the same reference numerals, and the description thereof will not be repeated.

As illustrated in FIG. 25, a period of frame N (first frame period) and a period of frame N+1 (second frame period) next to the frame N are alternately repeated. During the period of frame N, a first sub-frame RF, a second sub-frame GF, and a third sub-frame BF are sequentially processed. The third sub-frame BF is processed based on an average value of the gradation value B$_0$ during the period of frame N and the period of frame N+1.

During the period of frame N+1, the first sub-frame RF, the second sub-frame GF, and a fourth sub-frame WF are sequentially processed. According to this processing, one fourth sub-frame WF occurs across two frame periods, and the luminance increases. The ratio of the first sub-frame RF, the second sub-frame GF, or the third sub-frame BF in one frame is larger than that in the processing illustrated in FIG. 3. As a result, the first color, the second color, and the third color develop better, and the visibility is improved.

First Modification of Eighth Embodiment

Figure 26:
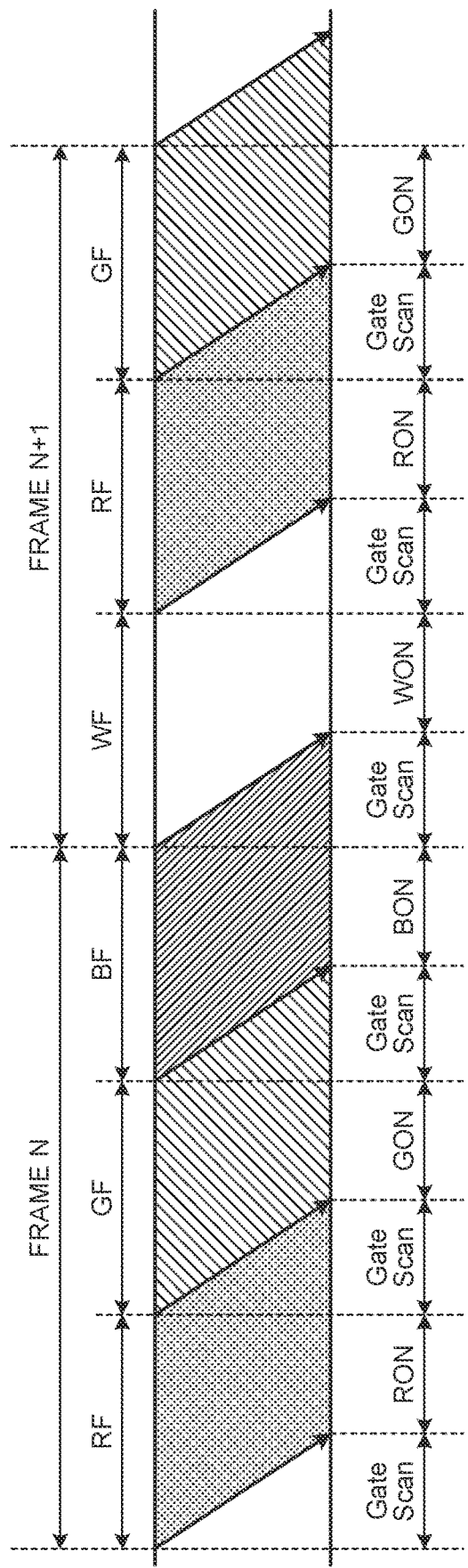
FIG. 26 is a timing diagram explaining the timing of the light emission by the light source in the field-sequential system according to a first modification of the eighth embodiment.

FIG. 26 is a timing diagram explaining the timing of the light emission by the light source in the field-sequential system according to a first modification of the eighth embodiment. The same components as those described in any one of the above-described embodiments are denoted by the same reference numerals, and the description thereof will not be repeated.

As illustrated in FIG. 26, the period of frame N and the period of frame N+1 are alternately repeated and processed. During the period of frame N, the first sub-frame RF, the second sub-frame GF, and the third sub-frame BF are sequentially processed.

During the period of frame N+1, the fourth sub-frame WF, the first sub-frame RF, and the second sub-frame GF are sequentially processed. According to this processing, one fourth sub-frames WF occurs across two frame periods, and the luminance increases. The ratio of the first sub-frame RF, the second sub-frame GF, or the third sub-frame BF in one frame is larger than that in the processing illustrated in FIG. 3. As a result, the first color, the second color, and the third color develop better, and the visibility is improved.

Second Modification of Eighth Embodiment

Figure 27:
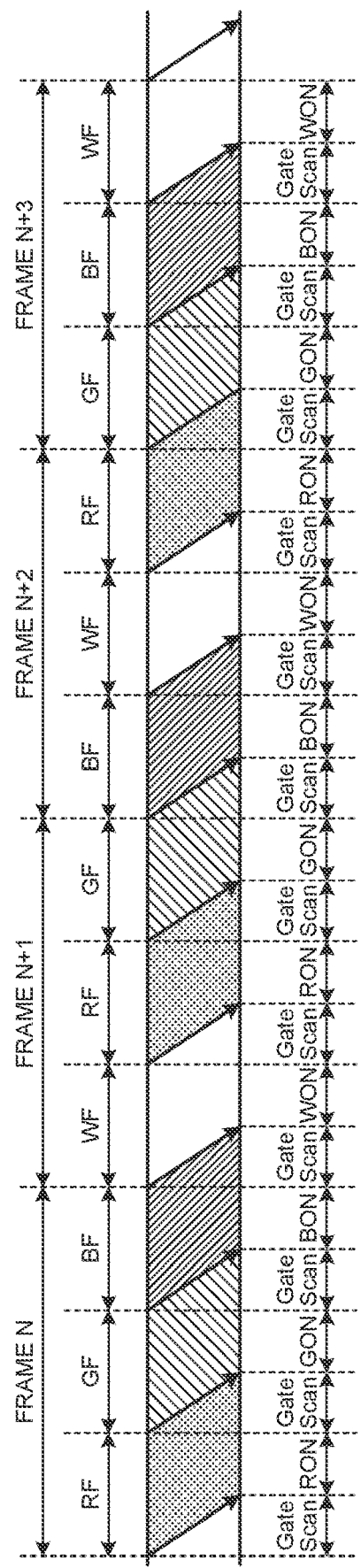
FIG. 27 is a timing diagram explaining the timing of the light emission by the light source in the field-sequential system according to a second modification of the eighth embodiment.

FIG. 27 is a timing diagram explaining the timing of the light emission by the light source in the field-sequential system according to a second modification of the eighth embodiment. The same components as those described in any one of the above-described embodiments are denoted by the same reference numerals, and the description thereof will not be repeated.

As illustrated in FIG. 27, the period of frame N (first frame period), the period of frame N+1 (second frame period), a period of frame N+2 (third frame period), and a period of frame N+3 (fourth frame period) are processed and the processing is repeated. During the period of frame N, the first sub-frame RF, the second sub-frame GF, and the third sub-frame BF are sequentially processed.

During the period of frame N+1, the fourth sub-frame WF, the first sub-frame RF, and the second sub-frame GF are sequentially processed. The same components as those described in any one of the above-described embodiments are denoted by the same reference numerals, and the description thereof will not be repeated.

During the period of frame N+2, the third sub-frame BF, the fourth sub-frame WF, and the first sub-frame RF are sequentially processed. During the period of frame N+3, the second sub-frame GF, the third sub-frame BF, and the fourth sub-frame WF are sequentially processed. According to this processing, three fourth sub-frames WF occur across four frame periods, and the luminance of the display device 1 increases. The ratio of the first sub-frame RF, the second sub-frame GF, or the third sub-frame BF in one frame is larger than that in the processing illustrated in FIG. 3. As a result, the first color, the second color, and the third color develop better, and the visibility is improved.

Third Modification of Eighth Embodiment

Figure 28:
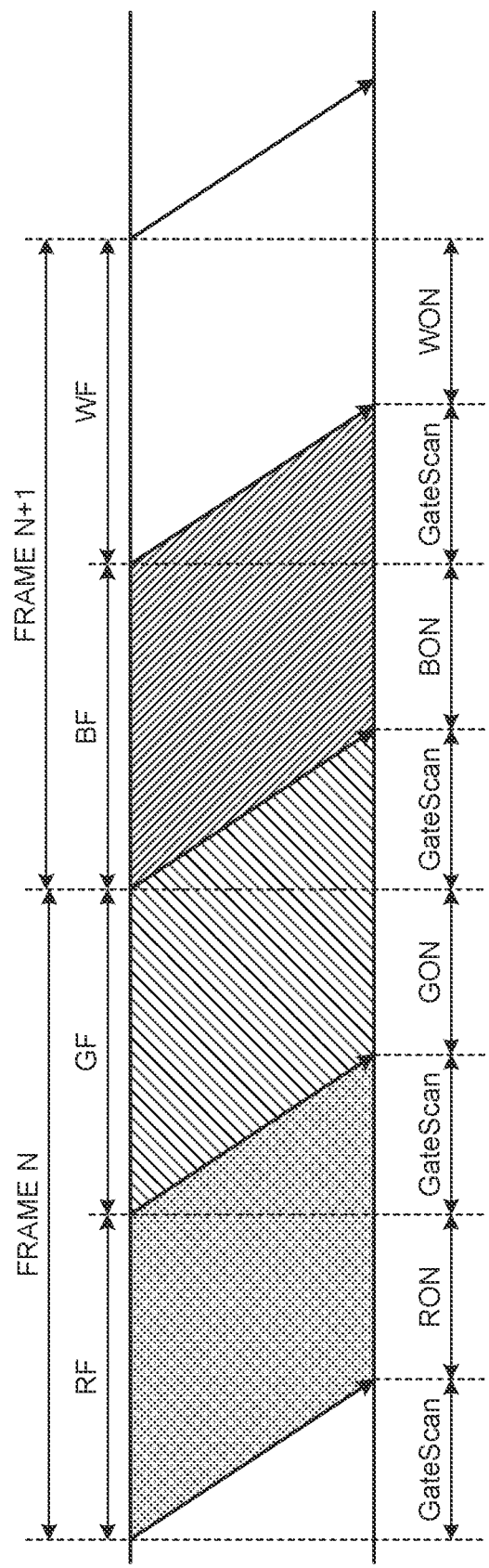
FIG. 28 is a timing diagram explaining the timing of the light emission by the light source in the field-sequential system according to a third modification of the eighth embodiment.

FIG. 28 is a timing diagram explaining the timing of the light emission by the light source in the field-sequential system according to a third modification of the eighth embodiment. The same components as those described in any one of the above-described embodiments are denoted by the same reference numerals, and the description thereof will not be repeated.

As illustrated in FIG. 28, the period of frame N (first frame period) and the period of frame N+1 (second frame period) next to the frame N are alternately repeated to be processed. During the period of frame N, the first sub-frame RF and the second sub-frame GF are sequentially processed.

During the period of frame N+1, the third sub-frame BF and the fourth sub-frame WF are sequentially processed. According to this processing, one fourth sub-frames WF occurs across two frame periods, and the luminance increases. The ratio of the first sub-frame RF, the second sub-frame GF, or the third sub-frame BF in one frame can be larger than that in the processing illustrated in FIG. 3. As a result, the first color, the second color, and the third color develop better, and the visibility is improved.

Ninth Embodiment

Figure 29:
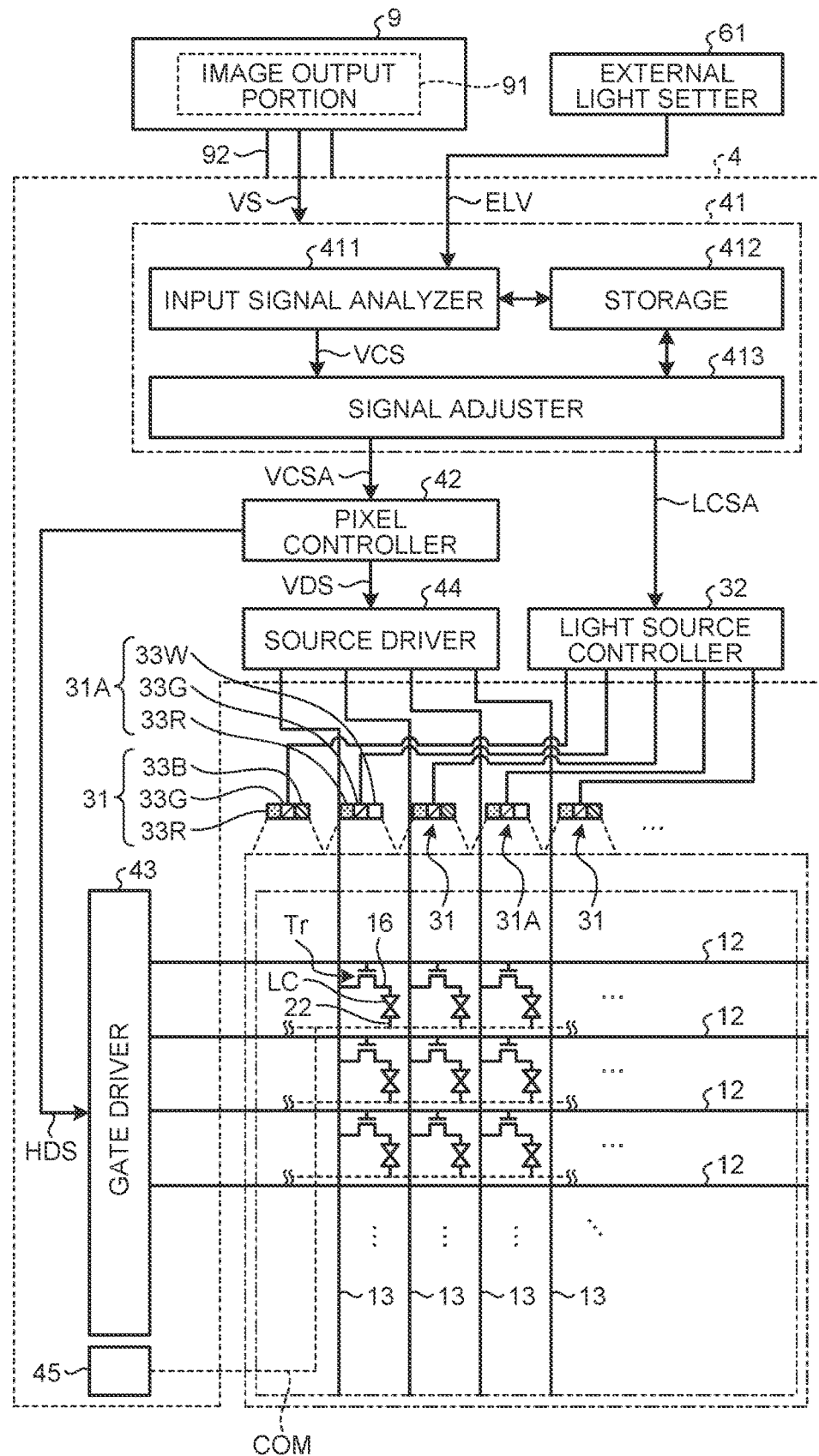
FIG. 29 is a block diagram illustrating a display device according to a ninth embodiment.

FIG. 29 is a block diagram illustrating a display device according to a ninth embodiment. As illustrated in FIG. 29, the light emitters 31 and light emitters 31A are alternately arranged. The same components as those described in any one of the above-described embodiments are denoted by the same reference numerals, and the description thereof will not be repeated.

Each of the light emitters 31 includes the light emitter 33R of the first color, the light emitter 33G of the second color, and the light emitter 33B of the third color. Each of the light emitters 31A includes the light emitter 33R of the first color, the light emitter 33G of the second color, and the light emitter 33W of the fourth color.

The display device of the ninth embodiment can also be applied to the first to the eighth embodiments described above.

Tenth Embodiment

Figure 30:
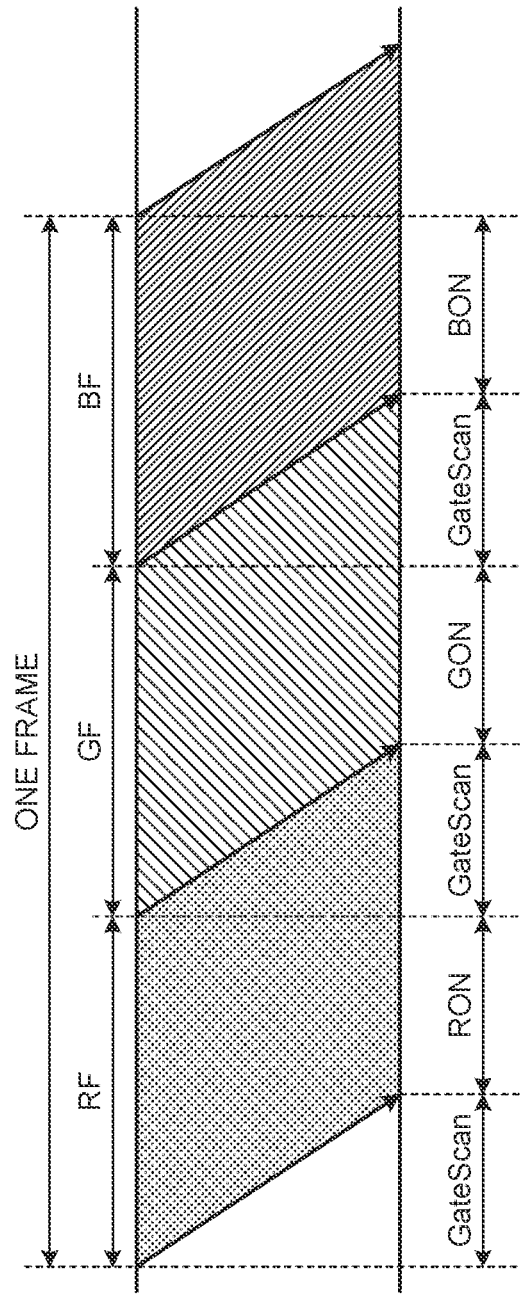
FIG. 30 is a timing diagram explaining the timing of the light emission by the light source in the field-sequential system according to a tenth embodiment.
Figure 31:
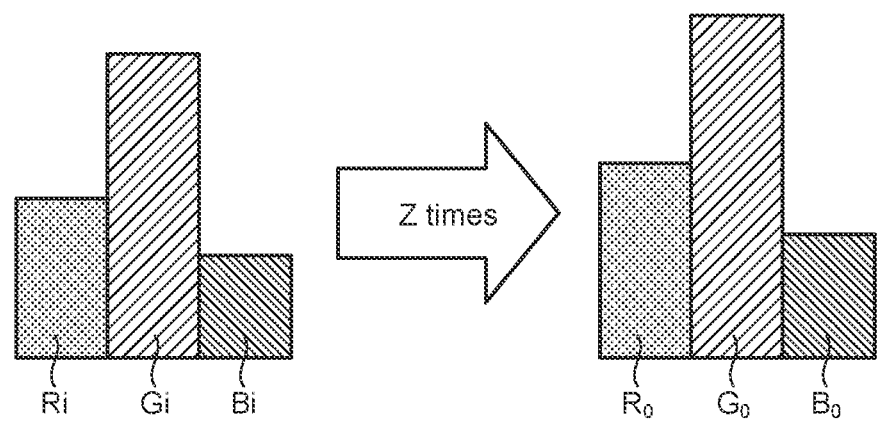
FIG. 31 is a diagram explaining the luminance increase by the signal processing from the input signal value to the output signal value in the tenth embodiment.
Figure 32:
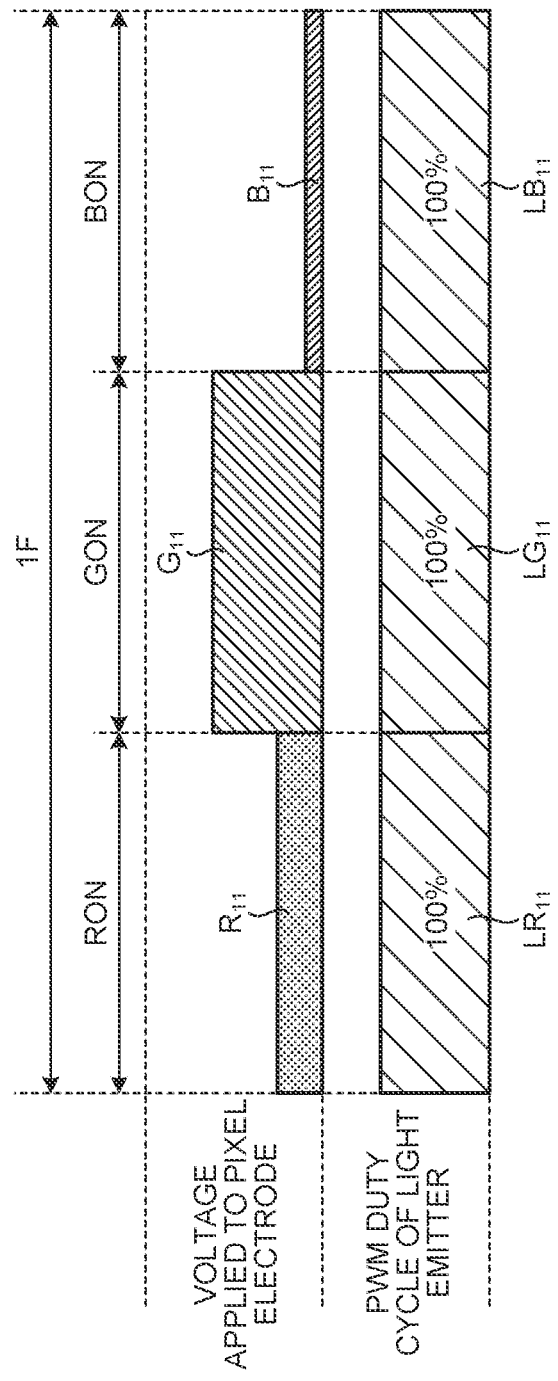
FIG. 32 illustrates an example of the voltage applied to the pixel electrode and the PWM duty cycle of each of the light emitters during the period of one frame in one pixel according to the tenth embodiment.

FIG. 30 is a timing diagram explaining the timing of the light emission by the light source in the field-sequential system according to a tenth embodiment. A display device of the tenth embodiment is the same as the display device of the first embodiment. FIG. 31 is a diagram explaining the luminance increase by the signal processing from the input signal value to the output signal value in the tenth embodiment. FIG. 32 illustrates an example of the voltage applied to the pixel electrode and the PWM duty cycle of each of the light emitters during the period of one frame in one of the pixels according to the tenth embodiment. The same components as those described in any one of the above-described embodiments are denoted by the same reference numerals, and the description thereof will not be repeated.

As illustrated in FIG. 30, the display device 1 repeatedly processes the period of frame N. During the period of frame N, the first sub-frame RF, the second sub-frame GF, and the third sub-frame BF are sequentially processed, and the processing is repeated.

The signal adjuster 413 illustrated in FIG. 2 reads the extension coefficient Z corresponding to the signal ELV of the external light information from the storage 412, as illustrated in FIG. 31. In the tenth embodiment, the extension coefficient Z is the coefficient equal to or larger than one.

In the tenth embodiment, the extension coefficient Z is stored in the storage 412. As described above, if the signal ELV of the external light information is equal to or larger than the threshold, or is in any one of the sunlit clear sky mode (first environment mode), the sunlit cloudy sky mode (second environment mode), and the indoor use mode (third environment mode), the extension coefficient Z is larger than one and is a constant value regardless of the level of the saturation S. For example, as illustrated in FIG. 15, the extension coefficient Z is two regardless of the level of the saturation S.

If the signal ELV of the external light information is smaller than the threshold, or is in the night use mode (fourth environment mode), the extension coefficient Z is one.

Thus, the extension coefficient Z is larger than one if the influence of the external light 69 is larger, or if the influence of the external light 69 is set as larger.

The input signal analyzer 411 obtains the RGB signals [$R_0$, $G_0$, $B_0$] of each of the pixels in the second input signal VCS based on Expressions (15) to (17) given below.

$$R_0 = Z \cdot R_i \quad (15)$$

$$G_0 = Z \cdot G_i \quad (16)$$

$$B_0 = Z \cdot B_i \quad (17)$$

The signal adjuster 413 generates the third input signal VCSA from the second input signal VCS. The third input signal VCSA has gradation values [$R_{11}$, $G_{11}$, $B_{11}$] that are the same as the gradation values [$R_0$, $G_0$, $B_0$] of the second input signal VCS.

The signal adjuster 413 also generates the light source control signal LCSA. The light emitter 33R of the first color, the light emitter 33G of the second color, and the light emitter 33B of the third color are driven at a PWM duty cycle of 100% based on gradation values [$LR_{11}$, $LG_{11}$, $LB_{11}$] of the light source control signal LCSA.

As described above, in each of the light emitters 31, any one of the first color, the second color, the third color, and the fourth color emits light in the field-sequential system. The drive circuit 4 converts the received first input signal VS into the second input signal VCS based on the RGB signals [$R_i$, $G_i$, $B_i$] of the first color, the second color, and the third color that are included in the first input signal VS and are each to be displayed by a corresponding one of the pixels.

The gradation values [$R_0$, $G_0$, $B_0$, $W_0$] of the second input signal VCS are obtained by multiplying the RGB signals [$R_i$, $G_i$, $B_i$] of the first color, the second color, and the third color by the extension coefficient of one or larger, and the display device 1 performs the display based on the second input signal VCS, and thus improves the visibility.

First Modification of Tenth Embodiment

Figure 33:
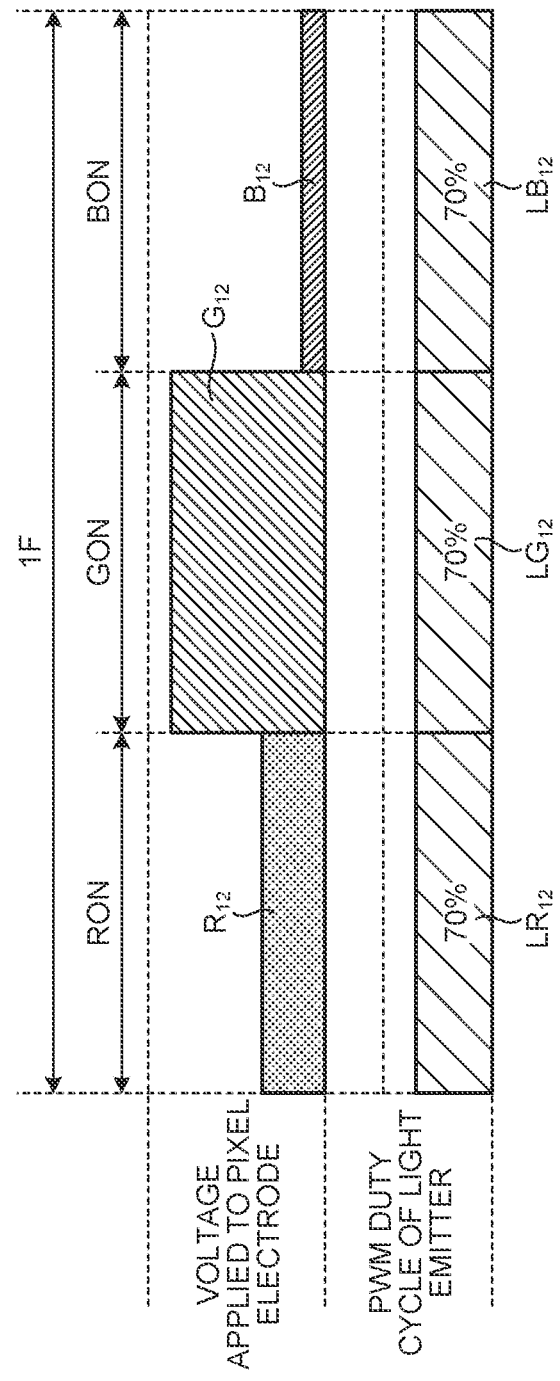
FIG. 33 illustrates an example of the voltage applied to the pixel electrode and the PWM duty cycle of each of the light emitters during the period of one frame in one pixel according to a first modification of the tenth embodiment.

FIG. 33 illustrates an example of the voltage applied to the pixel electrode and the PWM duty cycle of each of the light emitters during the period of one frame in one of the pixels according to a first modification of the tenth embodiment. The same components as those described in any one of the above-described embodiments are denoted by the same reference numerals, and the description thereof will not be repeated.

In the first modification of the tenth embodiment, the input signal analyzer 411 obtains the extension coefficient Z as described in the second embodiment. The input signal analyzer 411 obtains the RGB signals [$R_0$, $G_0$, $B_0$] of each of the pixels in the second input signal VCS based on the obtained extension coefficient Z and Expressions (15) to (17) given above.

Here, the PWM duty cycle of each of the light emitters 31 during the first color light emission period RON, the second color light emission period GON, the third color light emission period BON, and the fourth color light emission period WON is reduced by a factor of (1/Z).

In the first modification of the tenth embodiment, the signal adjuster 413 generates the light source control signal LCSA such that the factor (1/Z) is a PWM duty cycle of 70%. The drive circuit 4 drives the light emitter 33R of the first color, the light emitter 33G of the second color, and the light emitter 33B of the third color at a PWM duty cycle of 70% based on signal values [$LR_{12}$, $LG_{12}$, $LB_{12}$] of this light source control signal LCSA.

The signal adjuster 413 generates the third input signal VCSA from the second input signal VCS. The gradation values [$R_0$, $G_0$, $B_0$] of the second input signal VCS are equal to gradation values [$R_{12}$, $G_{12}$, $B_{12}$] in the third input signal VCSA.

Each of the light emitters 31 is driven at the PWM duty cycle proportional to the reciprocal of the extension coefficient Z. In this manner, the drive circuit 4 drives the light emitter 33R of the first color, the light emitter 33G of the second color, and the light emitter 33B of the third color at a uniformly reduced PWM duty cycle. Therefore, lower power consumption is achieved.

Second Modification of Tenth Embodiment

Figure 34:
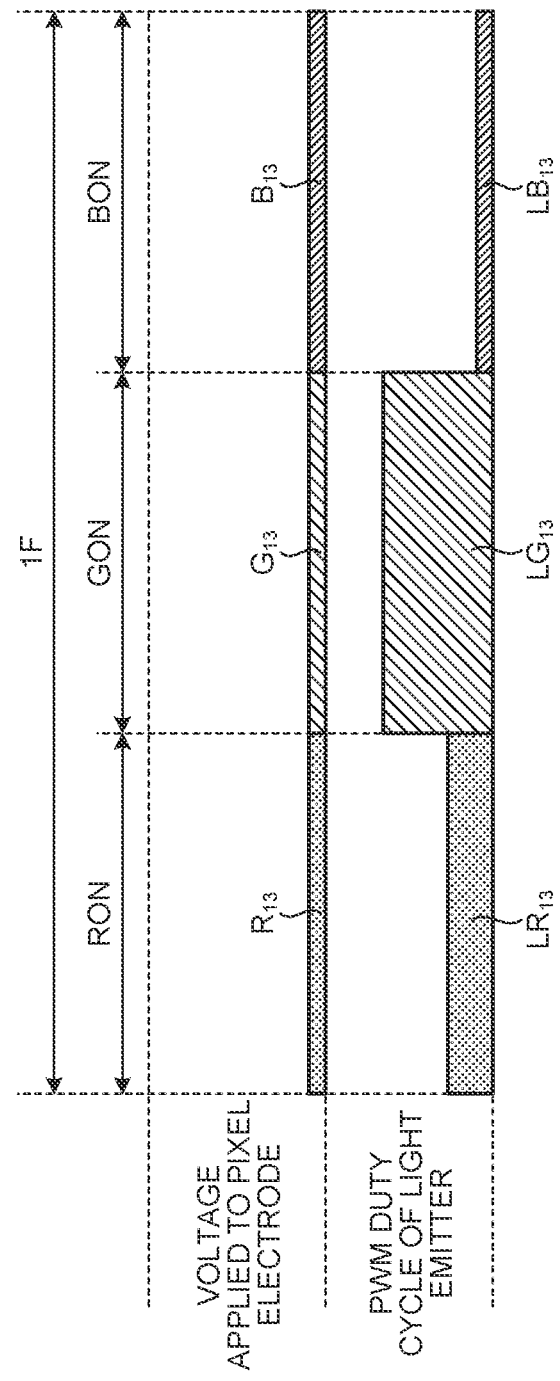
FIG. 34 illustrates an example of the voltage applied to the pixel electrode and the PWM duty cycle of each of the light emitters during the period of one frame in one pixel according to a second modification of the tenth embodiment.

FIG. 34 illustrates an example of the voltage applied to the pixel electrode and the PWM duty cycle of each of the light emitters during the period of one frame in one of the pixels according to a second modification of the tenth embodiment. The same components as those described in any one of the above-described embodiments are denoted by the same reference numerals, and the description thereof will not be repeated.

The signal adjuster 413 identifies a gradation value that is not zero and is minimum of the gradation values [$R_0$, $G_0$, $B_0$] as the reference value. In the second modification of the tenth embodiment, the gradation value $B_0$ is the reference value. Then, the signal adjuster 413 calculates the gradation values [$R_{13}$, $G_{13}$, $B_{13}$] of the third input signal VCSA so as to be the following values.

$$R_{13}=G_{13}=B_{13}=B_0$$

Then, the signal adjuster 413 generates the light source control signal LCSA based on the gradation values [$R_0$, $G_0$, $B_0$] of the second input signal VCS. When LS denotes the reference PWM duty cycle, signal values [$LR_{13}$, $LG_{13}$, $LB_{13}$] of the light source control signal LCSA are generated as signal values [$LS \times R_0/B_0$, $LS \times G_0/B_0$, $LS \times B_0/B_0$].

As described above, the drive circuit 4 or the analyzer 41 selects, as the reference value, the gradation value of one of the first color, the second color, and the third color that are included in the second input signal VCS and are each to be displayed by one of the pixels Pix. During the first color light emission period RON, the second color light emission period GON, and the third color light emission period BON, the voltage is applied to the pixel electrode 16 that is the certain first electrode based on the gradation value $B_0$ that is the above-described reference value.

During the first color light emission period RON, the light emitters 31 are controlled at the pulse width modulation duty cycle proportional to the coefficient obtained by dividing the gradation value $R_0$ of the first color by the gradation value $B_0$ that is the reference value. The gradation value $R_0$ of the first color is included in the second input signal VCS and is to be displayed by one of the pixels Pix.

During the second color light emission period GON, the light emitters 31 are controlled at the pulse width modulation duty cycle proportional to the coefficient obtained by dividing the gradation value $G_0$ of the second color by the gradation value $B_0$ that is the reference value. The gradation value $G_0$ of the second color is included in the second input signal VCS and is to be displayed by one of the pixels Pix.

During the third color light emission period BON, the light emitters 31 are controlled at the pulse width modulation duty cycle proportional to the coefficient obtained by dividing the gradation value $B_0$ of the third color by the gradation value $B_0$ that is the reference value. The gradation value $B_0$ of the third color is included in the second input signal VCS and is to be displayed by one of the pixels Pix.

As a result, the constant voltage is applied to the pixel electrode 16 during one frame, so that the drive frequency of the voltage applied to the pixel electrode 16 can be reduced.

Third Modification of Tenth Embodiment

Figure 35:
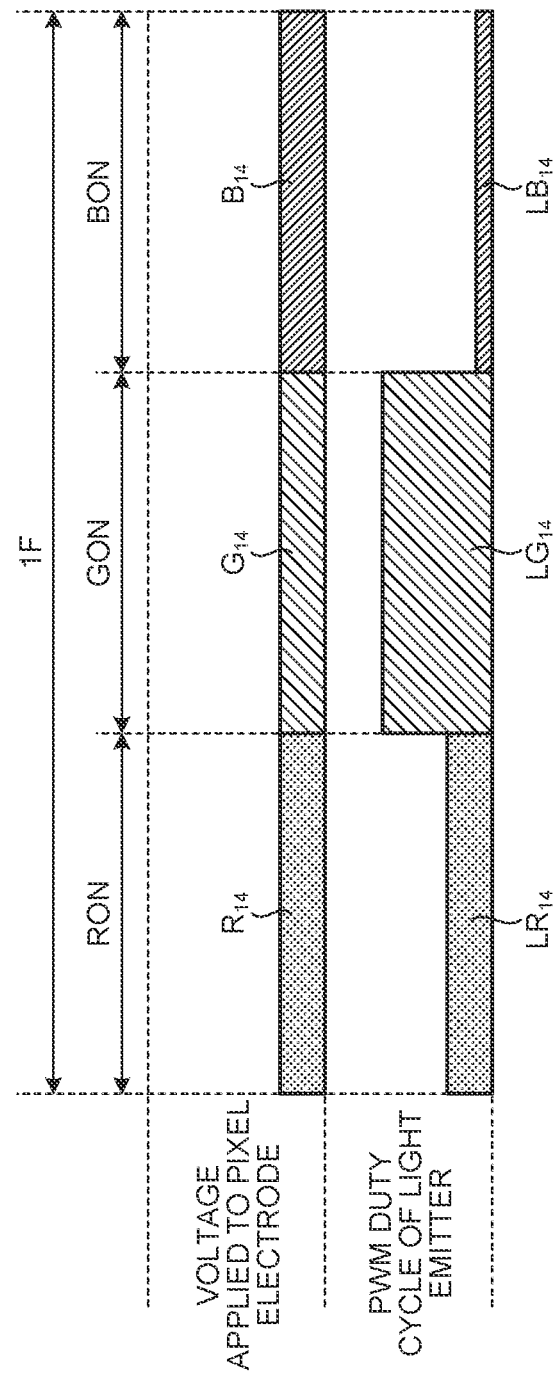
FIG. 35 illustrates an example of the voltage applied to the pixel electrode and the PWM duty cycle of each of the light emitters during the period of one frame in one pixel according to a third modification of the tenth embodiment.

FIG. 35 illustrates an example of the voltage applied to the pixel electrode and the PWM duty cycle of each of the light emitters during the period of one frame in one of the pixels according to a third modification of the tenth embodiment. The same components as those described in any one of the above-described embodiments are denoted by the same reference numerals, and the description thereof will not be repeated.

The signal adjuster 413 identifies a gradation value that is not zero and is a second largest gradation value among the gradation values [$R_0$, $G_0$, $B_0$] as the reference value. In the third modification of the tenth embodiment, the gradation value $R_0$ is the reference value. Then, the signal adjuster 413 calculates gradation values [$R_{14}$, $G_{14}$, $B_{14}$] of the third input signal VCSA so as to be the following values.

$$R_{14}=G_{14}=B_{14}=R_0$$

Then, the signal adjuster 413 generates the light source control signal LCSA based on the gradation values [$R_0$, $G_0$, $B_0$] of the second input signal VCS. When LS denotes the reference PWM duty cycle, signal values [$LR_{14}$, $LG_{14}$, $LB_{14}$] of the light source control signal LCSA are generated as signal values [$LS \times R_0/R_0$, $LS \times G_0/R_0$, $LS \times B_0/R_0$].

As described above, the drive circuit 4 or the analyzer 41 selects, as the reference value, the gradation value of one of the first color, the second color, and the third color that are included in the second input signal VCS and are each to be displayed by one of the pixels Pix. During the first color light emission period RON, the second color light emission period GON, and the third color light emission period BON, the voltage is applied to the pixel electrode 16 that is the certain first electrode based on the gradation value $R_0$ that is the above-described reference value.

During the first color light emission period RON, the light emitters 31 are controlled at the pulse width modulation duty cycle proportional to the coefficient obtained by dividing the gradation value $R_0$ of the first color by the gradation value $R_0$ that is the reference value. The gradation value $R_0$ of the first color is included in the second input signal VCS and is to be displayed by one of the pixels Pix.

During the second color light emission period GON, the light emitters 31 are controlled at the pulse width modulation duty cycle proportional to the coefficient obtained by dividing the gradation value $G_0$ of the second color by the gradation value $R_0$ that is the reference value. The gradation value $G_0$ of the second color is included in the second input signal VCS and is to be displayed by one of the pixels Pix.

During the third color light emission period BON, the light emitters 31 are controlled at the pulse width modulation duty cycle proportional to the coefficient obtained by dividing the gradation value $B_0$ of the third color by the gradation value $R_0$ that is the reference value. The gradation value $B_0$ of the third color is included in the second input signal VCS and is to be displayed by one of the pixels Pix.

As a result, the constant voltage is applied to the pixel electrode 16 during one frame, so that the drive frequency of the voltage applied to the pixel electrode 16 can be reduced.

Fourth Modification of Tenth Embodiment

Figure 36:
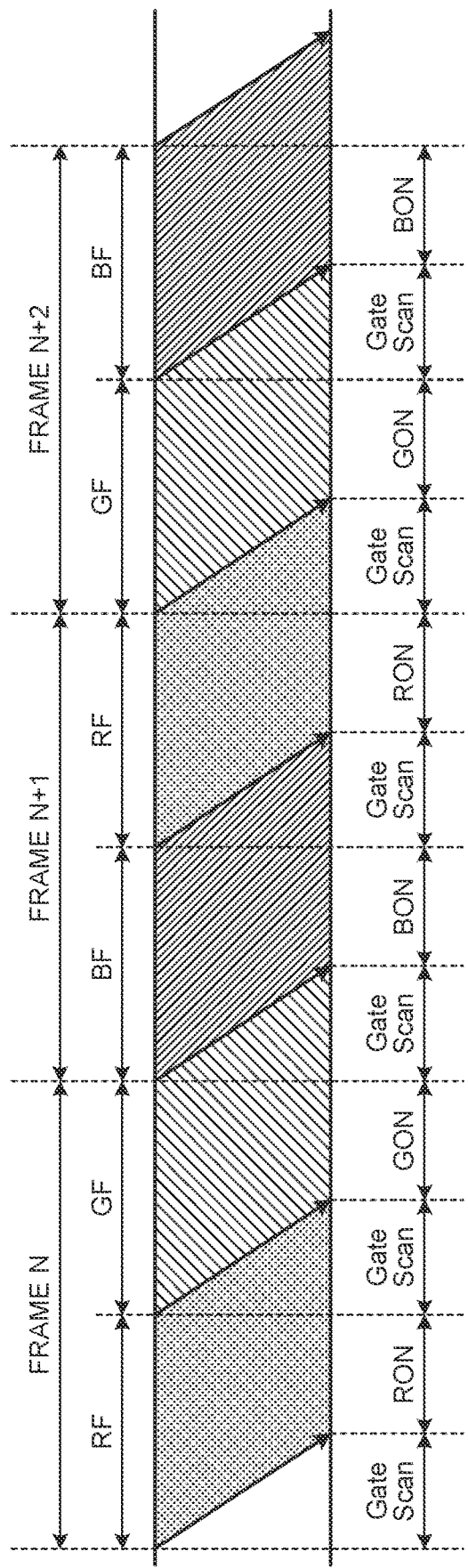
FIG. 36 is a timing diagram explaining the timing of the light emission by the light source in the field-sequential system according to a fourth modification of the tenth embodiment.

FIG. 36 is a timing diagram explaining the timing of the light emission by the light source in the field-sequential system according to a fourth modification of the tenth embodiment. The same components as those described in any one of the above-described embodiments are denoted by the same reference numerals, and the description thereof will not be repeated.

As illustrated in FIG. 36, the period of frame N, the period of frame N+1, and the period of frame N+2 are sequentially processed, and the processing is repeated. During the period of frame N, the first sub-frame RF and the second sub-frame GF are sequentially processed.

During the period of frame N+1, the third sub-frame BF and the first sub-frame RF are sequentially processed.

During the period of frame N+2, the second sub-frame GF and the third sub-frame BF are sequentially processed. The ratio of the first sub-frame RF, the second sub-frame GF, or the third sub-frame BF in one frame is larger than that in the processing illustrated in FIG. 3. As a result, the first color, the second color, and the third color develop better, and the visibility is improved.

The preferable embodiments of the present disclosure have been described above. The present disclosure is, however, not limited to the embodiments described above. The content disclosed in the embodiments is merely an example, and can be variously modified within the scope not departing from the gist of the present disclosure. Any modifications appropriately made within the scope not departing from the gist of the present disclosure also naturally belong to the technical scope of the present disclosure. All technologies that can be carried out by those skilled in the art through appropriate design modifications based on the disclosure described above also belong to the technical scope of the present disclosure as long as including the gist of the present disclosure.

The display panel 2 may be, for example, a passive-matrix panel including no switching element. The passive-matrix panel includes first electrodes extending in the PX direction, second electrodes extending in the PY direction, in the plan view, and wiring electrically coupled to the first electrodes or the second electrodes. The first and second electrodes and the wiring are made of, for example, ITO. For example, the first light-transmitting substrate 10 including the first electrodes and the second light-transmitting substrate 20 including the second electrodes are opposed to each other across the liquid crystal layer 50.

Although the example has been described in which the first and the second orientation films 55 and 56 are vertical orientation films, the first and the second orientation films 55 and 56 may be both horizontal orientation films. The first and the second orientation films 55 and 56 only need to have a function to orient a monomer in a predetermined direction when polymerizing the monomer. As a result, the monomer is polymerized into a polymer in the state oriented in the predetermined direction. When the first and the second orientation films 55 and 56 are the horizontal orientation films, the direction of the optical axis Ax1 of the bulk 51 is equal to the direction of the optical axis Ax2 of the fine particles 52 and is orthogonal to the PZ direction when no voltage is applied between the pixel electrode 16 and the common electrode 22. The direction orthogonal to the PZ direction corresponds to the PX direction or the PY direction along a side of the first light-transmitting substrate 10 in the plan view.

The present disclosure can also have the following aspects.

(1) A display device including:

a first light-transmitting substrate, a second light-transmitting substrate opposed to the first light-transmitting substrate, a liquid crystal layer including polymer dispersed liquid crystals filled between the first light-transmitting substrate and the second light-transmitting substrate, at least one light emitter opposed to at least one of a side surface of the first light-transmitting substrate and a side surface of the second light-transmitting substrate, and a first electrode and a second electrode disposed so as to sandwich the liquid crystal layer, in which in the light emitter, any one of a first color, a second color, and a third color emits light in a field-sequential system, and the display device includes a drive circuit that obtains a second input signal by multiplying gradation values of the first color, the second color, and the third color that are included in a received first input signal and are each to be displayed by a corresponding one of pixels by an extension coefficient equal to or larger than one.

(2) The display device according to (1) described above, in which the first light-transmitting substrate has a first principal surface and a second principal surface as a surface parallel to the first principal surface, the second light-transmitting substrate has a first principal surface and a second principal surface as a surface parallel to the first principal surface, and when the polymer dispersed liquid crystals are in a non-scattering state, a background on the first principal surface side of the second light-transmitting substrate is visible from the first principal surface of the first light-transmitting substrate, or a background on the first principal surface side of the first light-transmitting substrate is visible from the first principal surface of the second light-transmitting substrate.

(3) The display device according to (1) or (2) described above, in which the light emitter is controlled such that a pulse width modulation duty cycle is proportional to a reciprocal of the extension coefficient and the first color, the second color, and the third color have the same pulse width modulation duty cycle, and a voltage corresponding to each of the gradation values of the first color, the second color, and the third color included in the second input signal is applied to the first electrode.

(4) The display device according to (1) or (2) described above, in which the light emitter is controlled such that an emission intensity is proportional to a reciprocal of the extension coefficient, and the emission intensity is the same for the first color, the second color, and the third color, and a voltage corresponding to each of the gradation values of the first color, the second color, and the third color included in the second input signal is applied to the first electrode.

(5) The display device according to (3) or (4) described above, in which a voltage applied to the first electrode based on a maximum gradation among gradations of the first color, the second color, and the third color that are included in the second input signal and are each to be displayed by one of the pixels is lower than a saturation voltage at which a change in scattering rate in the pixel becomes smaller as the voltage applied to the first electrode increases.

(6) The display device according to (1) or (2) described above, in which a gradation value of one of the first color, the second color, and the third color that are included in the second input signal and are each to be displayed by one of the pixels is selected as a reference value, and a constant voltage is applied to the first electrode based on the gradation of the reference value during a light emission period of the first color, a light emission period of the second color, and a light emission period of the third color.

(7) The display device according to (6) described above, in which the light emitter is controlled at a pulse width modulation duty cycle proportional to a coefficient obtained by dividing a gradation value of the first color by the reference value during the light emission period of the first color, a gradation value of the first color being included in the second input signal and being to be displayed by one of the pixels, the light emitter is controlled at a pulse width modulation duty cycle proportional to a coefficient obtained by dividing a gradation value of the second color by the reference value during the light emission period of the second color, a gradation value of the second color being included in the second input signal and being to be displayed by one of the pixels, and the light emitter is controlled at a pulse width modulation duty cycle proportional to a coefficient obtained by dividing a gradation value of the third color by the reference value during the light emission period of the third color, a gradation value of the third color being included in the second input signal and being to be displayed by one of the pixels.

(8) The display device according to (6) or (7) described above, in which the reference value is a minimum gradation value among gradation values of the first color, the second color, and the third color that are included in the second input signal and are each to be displayed by one of the pixels.

(9) The display device according to (6) or (7) described above, in which the reference value is an intermediate gradation value among gradation values of the first color, the second color, and the third color that are included in the second input signal and are each to be displayed by one of the pixels.

(10) The display device according to any one of (1) to (9) described above, in which a light emission period of the first color, a light emission period of the second color, and a light emission period of the third color are sequentially processed in one frame period.

(11) The display device according to any one of (1) to (9) described above, in which a light emission period of the first color and a light emission period of the second color are sequentially processed in a first frame period, a light emission period of the third color and the light emission period of the first color are sequentially processed in a second frame period next to the first frame period, and the light emission period of the second color and the light emission period of the third color are sequentially processed in a third frame period next to the second frame period.

What is claimed is:
1. A display device comprising:
a first light-transmitting substrate;
a second light-transmitting substrate opposed to the first light-transmitting substrate;
a liquid crystal layer comprising polymer dispersed liquid crystals filled between the first light-transmitting substrate and the second light-transmitting substrate;
at least one light emitter opposed to at least one of a side surface of the first light-transmitting substrate and a side surface of the second light-transmitting substrate; and
a first electrode and a second electrode disposed so as to sandwich the liquid crystal layer,
wherein
in the light emitter, any one of a first color, a second color, a third color, and a fourth color emits light in a field-sequential system,
the display device comprises a drive circuit configured to convert a received first input signal into a second input signal including gradation values of the first color, the second color, the third color, and the fourth color based on red-green-blue (RGB) signals of the first color, the second color, and the third color that are included in the first input signal and are each to be displayed by a corresponding one of pixels,
the light emitter comprises
a first light emitter configured to emit light in the first color,
a second light emitter configured to emit light in the second color, and
a third light emitter configured to emit light in the third color,
the first light emitter, the second light emitter, and the third light emitter are configured to simultaneously emit light during a light emission period of the fourth color in which the fourth color emits light,
the first light emitter has a temperature characteristic in which a relative light intensity decreases more with increase in a heating temperature than in the case of the second light emitter and the third light emitter, and
the first light emitter is configured to be driven in a state where a pulse width modulation duty cycle thereof is multiplied by a coefficient smaller than those of the second light emitter and the third light emitter.

2. A display device comprising:
a first light-transmitting substrate;
a second light-transmitting substrate opposed to the first light-transmitting substrate;
a liquid crystal layer comprising polymer dispersed liquid crystals filled between the first light-transmitting substrate and the second light-transmitting substrate;
at least one light emitter opposed to at least one of a side surface of the first light-transmitting substrate and a side surface of the second light-transmitting substrate; and
a first electrode and a second electrode disposed so as to sandwich the liquid crystal layer,
wherein
in the light emitter, any one of a first color, a second color, a third color, and a fourth color emits light in a field-sequential system,
the display device comprises a drive circuit configured to convert a received first input signal into a second input signal including gradation values of the first color, the second color, the third color, and the fourth color based on red-green-blue (RGB) signals of the first color, the second color, and the third color that are included in the first input signal and are each to be displayed by a corresponding one of pixels,
a gradation value of one of the first color, the second color, and the third color that are included in the second input signal and are each to be displayed by one of the pixels is configured to be selected as a reference value,
a constant voltage is configured to be applied to the first electrode based on the gradation of the reference value during a light emission period of the first color, a light emission period of the second color, a light emission period of the third color, and a light emission period of the fourth color,
the light emitter is configured to be controlled at a pulse width modulation duty cycle proportional to a coefficient obtained by dividing a gradation value of the first color by the reference value during the light emission period of the first color, the gradation value of the first color being included in the second input signal and being to be displayed by one of the pixels,
the light emitter is configured to be controlled at a pulse width modulation duty cycle proportional to a coefficient obtained by dividing a gradation value of the second color by the reference value during the light emission period of the second color, the gradation value of the second color being included in the second input signal and being to be displayed by one of the pixels,
the light emitter is configured to be controlled at a pulse width modulation duty cycle proportional to a coefficient obtained by dividing a gradation value of the third color by the reference value during the light emission period of the third color, the gradation value of the third color being included in the second input signal and being to be displayed by one of the pixels, and
the light emitter is configured to be controlled at a pulse width modulation duty cycle proportional to a coefficient obtained by dividing a gradation value of the fourth color by the reference value during the light emission period of the fourth color, the gradation value of the fourth color being included in the second input signal and being to be displayed by one of the pixels.

3. A display device comprising:
a first light-transmitting substrate;
a second light-transmitting substrate opposed to the first light-transmitting substrate;
a liquid crystal layer comprising polymer dispersed liquid crystals filled between the first light-transmitting substrate and the second light-transmitting substrate;
at least one light emitter opposed to at least one of a side surface of the first light-transmitting substrate and a side surface of the second light-transmitting substrate; and
a first electrode and a second electrode disposed so as to sandwich the liquid crystal layer,
wherein
in the light emitter, any one of a first color, a second color, a third color, and a fourth color emits light in a field-sequential system,
the display device comprises a drive circuit configured to convert a received first input signal into a second input signal including gradation values of the first color, the second color, the third color, and the fourth color based on red-green-blue (RGB) signals of the first color, the second color, and the third color that are included in the first input signal and are each to be displayed by a corresponding one of pixels,
a light emission period of the first color, a light emission period of the second color, and a light emission period of the third color are configured to be sequentially processed in a first frame period, and
the light emission period of the first color, the light emission period of the second color, and a light emission period of the fourth color are configured to be sequentially processed in a second frame period next to the first frame period.

4. The display device according to claim 3, wherein a gradation value of each of the first color, the second color, and the third color included in the second input signal is configured to be obtained based on a function of an extension coefficient equal to or larger than one and a gradation value of a corresponding one of the first color, the second color, and the third color included in the first input signal.

5. The display device according to claim 4, wherein the gradation value of the fourth color included in the second input signal is configured to be obtained based on a function of the extension coefficient, a luminance increase ratio of the fourth color in the light emitter, and a minimum value among the gradation value of the first color, the gradation value of the second color, and the gradation value of the third color included in the first input signal.

6. The display device according to claim 4, wherein the light emitter is configured to be driven at a pulse width modulation duty cycle proportional to a reciprocal of the extension coefficient.

7. The display device according to claim 3, wherein
the first light-transmitting substrate has a first principal surface and a second principal surface as a surface parallel to the first principal surface,
the second light-transmitting substrate has a first principal surface and a second principal surface as a surface parallel to the first principal surface, and
when the polymer dispersed liquid crystals are in a non-scattering state, a background on the first principal surface side of the second light-transmitting substrate is visible from the first principal surface of the first light-transmitting substrate, or a background on the first principal surface side of the first light-transmitting substrate is visible from the first principal surface of the second light-transmitting substrate.

8. The display device according to claim 3, wherein the light emitter comprises a first light emitter configured to emit light in the first color, a second light emitter configured to emit light in the second color, and a third light emitter configured to emit light in the third color, and the first light emitter, the second light emitter, and the third light emitter are configured to simultaneously emit light during the light emission period of the fourth color in which the fourth color emits light.

9. The display device according to claim 3, wherein the light emitter comprises a first light emitter configured to emit light in the first color, a second light emitter configured to emit light in the second color, a third light emitter configured to emit light in the third color, and a fourth light emitter configured to emit light in the fourth color.

10. The display device according to claim 3, wherein
the light emitter is configured to be controlled such that the first color, the second color, the third color, and the fourth color have the same pulse width modulation duty cycle, and a voltage corresponding to each of the gradation values of the first color, the second color, the third color, and the fourth color included in the second input signal is configured to be applied to the first electrode.

11. The display device according to claim 3, wherein
the light emitter is configured to be controlled such that the first color, the second color, the third color, and the fourth color have the same emission intensity, and a voltage corresponding to each of the gradation values of the first color, the second color, the third color, and the fourth color included in the second input signal is configured to be applied to the first electrode.

12. The display device according to claim 10, wherein a voltage configured to be applied to the first electrode based on a maximum gradation among gradations of the first color, the second color, and the third color that are included in the second input signal and are each to be displayed by one of the pixels is lower than a saturation voltage at which a change in scattering rate in the pixel becomes smaller as the voltage applied to the first electrode increases.

13. The display device according to claim 3, wherein
a gradation value of one of the first color, the second color, and the third color that are included in the second input signal and are each to be displayed by one of the pixels is configured to be selected as a reference value, and a constant voltage is configured to be applied to the first electrode based on the gradation of the reference value during the light emission period of the first color, the light emission period of the second color, the light emission period of the third color, and the light emission period of the fourth color.

14. The display device according to claim 13, wherein the reference value is a minimum gradation value among the gradation values of the first color, the second color, and the third color that are included in the second input signal and are each to be displayed by one of the pixels.

15. The display device according to claim 13, wherein the reference value is an intermediate gradation value among the gradation values of the first color, the second color, and the third color that are included in the second input signal and are each to be displayed by one of the pixels.

16. A display device comprising:
a first light-transmitting substrate;
a second light-transmitting substrate opposed to the first light-transmitting substrate;
a liquid crystal layer comprising polymer dispersed liquid crystals filled between the first light-transmitting substrate and the second light-transmitting substrate;
at least one light emitter opposed to at least one of a side surface of the first light-transmitting substrate and a side surface of the second light-transmitting substrate; and
a first electrode and a second electrode disposed so as to sandwich the liquid crystal layer,
wherein
in the light emitter, any one of a first color, a second color, a third color, and a fourth color emits light in a field-sequential system,
the display device comprises a drive circuit configured to convert a received first input signal into a second input signal including gradation values of the first color, the second color, the third color, and the fourth color based on red-green-blue (RGB) signals of the first color, the second color, and the third color that are included in the first input signal and are each to be displayed by a corresponding one of pixels,
a light emission period of the first color, a light emission period of the second color, and a light emission period of the third color are configured to be sequentially processed in a first frame period, and
a light emission period of the fourth color, the light emission period of the first color, and the light emission period of the second color are configured to be sequentially processed in a second frame period next to the first frame period.

17. A display device comprising:
a first light-transmitting substrate;
a second light-transmitting substrate opposed to the first light-transmitting substrate;
a liquid crystal layer comprising polymer dispersed liquid crystals filled between the first light-transmitting substrate and the second light-transmitting substrate;
at least one light emitter opposed to at least one of a side surface of the first light-transmitting substrate and a side surface of the second light-transmitting substrate; and
a first electrode and a second electrode disposed so as to sandwich the liquid crystal layer,
wherein
in the light emitter, any one of a first color, a second color, a third color, and a fourth color emits light in a field-sequential system,
the display device comprises a drive circuit configured to convert a received first input signal into a second input signal including gradation values of the first color, the second color, the third color, and the fourth color based on red-green-blue (RGB) signals of the first color, the second color, and the third color that are included in the first input signal and are each to be displayed by a corresponding one of pixels,
a light emission period of the first color, a light emission period of the second color, and a light emission period of the third color are configured to be sequentially processed in a first frame period,
a light emission period of the fourth color, the light emission period of the first color, and the light emission period of the second color are configured to be sequentially processed in a second frame period next to the first frame period,
the light emission period of the third color, the light emission period of the fourth color, and the light emission period of the first color are configured to be sequentially processed in a third frame period next to the second frame period, and the light emission period of the second color, the light emission period of the third color, and the light emission period of the fourth color are configured to be sequentially processed in a fourth frame period next to the third frame period.

18. A display device comprising:

a first light-transmitting substrate;

a second light-transmitting substrate opposed to the first light-transmitting substrate;

a liquid crystal layer comprising polymer dispersed liquid crystals filled between the first light-transmitting substrate and the second light-transmitting substrate;

at least one light emitter opposed to at least one of a side surface of the first light-transmitting substrate and a side surface of the second light-transmitting substrate; and a first electrode and a second electrode disposed so as to sandwich the liquid crystal layer, wherein in the light emitter, any one of a first color, a second color, a third color, and a fourth color emits light in a field-sequential system, the display device comprises a drive circuit configured to convert a received first input signal into a second input signal including gradation values of the first color, the second color, the third color, and the fourth color based on red-green-blue (RGB) signals of the first color, the second color, and the third color that are included in the first input signal and are each to be displayed by a corresponding one of pixels, a light emission period of the first color and a light emission period of the second color are configured to be sequentially processed in a first frame period, and a light emission period of the third color and a light emission period of the fourth color are configured to be sequentially processed in a second frame period next to the first frame period.

* * * * *